United States Patent
Zhang

(10) Patent No.: US 11,860,318 B2
(45) Date of Patent: Jan. 2, 2024

(54) RECONSTRUCTION SYSTEM AND METHOD

(71) Applicant: CARPATCHIOT B.V., Leuven (BE)

(72) Inventor: Miaomiao Zhang, Beijing (CN)

(73) Assignee: CARPATCHIOT B.V., Leuven (BE)

( * ) Notice: Subject to any disclaimer, the term of this patent is extended or adjusted under 35 U.S.C. 154(b) by 765 days.

(21) Appl. No.: 16/975,105

(22) PCT Filed: Feb. 25, 2019

(86) PCT No.: PCT/EP2019/054539
§ 371 (c)(1),
(2) Date: Aug. 21, 2020

(87) PCT Pub. No.: WO2019/162485
PCT Pub. Date: Aug. 29, 2019

(65) Prior Publication Data
US 2020/0400802 A1  Dec. 24, 2020

(30) Foreign Application Priority Data

Feb. 23, 2018 (GB) .................................... 1802942

(51) Int. Cl.
*G01S 7/52* (2006.01)
(52) U.S. Cl.
CPC ...... *G01S 7/52034* (2013.01); *G01S 7/52087* (2013.01); *G01S 7/52092* (2013.01)
(58) Field of Classification Search
None
See application file for complete search history.

(56) References Cited

PUBLICATIONS

Ng, M. et al., "Solving Constrained Total-Variation Image Restoration and Reconstruction Problems via Alternating Direction Methods," Society for Industrial and Applied Mathematics, vol. 32, No. 5, Aug. 31, 2010, 30 pages.
Basarab, A. et al., "Medical ultrasound image reconstruction using distributed compressive sampling," Proceedings of the IEEE International Symposium on Biomedical Imaging: From Nano to Macro (ISBI 2013), Apr. 7, 2013, San Francisco, California, 6 pages.
Chen, Z. et al., "Compressive Deconvolution in Medical Ultrasound Imaging," IEEE Transactions on Medical Imaging, vol. 35, No. 3, Oct. 26, 2015, 17 pages.

(Continued)

*Primary Examiner* — Isam A Alsomiri
*Assistant Examiner* — Vikas Atmakuri
(74) *Attorney, Agent, or Firm* — McCoy Russell LLP

(57) ABSTRACT

A method for reconstructing a signal from a subset of the full signal is disclosed. In one embodiment, the method includes receiving a plurality of randomly sampled multichannel radio-frequency or in-phase and quadrature signals acquired from a physical environment including a transmitter, a propagation medium and a receiver; modelling the full signal as a matrix comprising a plurality of vector signals wherein the full signal is expressed as a matrix product of a first matrix and a second matrix; updating the second matrix based on an objective function to produce an updated second matrix; determining a convergence parameter in dependence upon the evaluated objective function; and modifying the updated second matrix in dependence upon the convergence parameter.

22 Claims, 15 Drawing Sheets

(56) References Cited

PUBLICATIONS

Chen, Z. et al., "Reconstruction of Enhanced Ultrasound Images From Compressed Measurements Using Simultaneous Direction Method of Multipliers," IEEE Transactions on Ultrasonics, Ferroelectrics, and Frequency Control, vol. 63, No. 10, Jul. 21, 2016, 14 pages.

Schretter, C. et al., "Ultrasound Imaging From Sparse RF Samples Using System Point Spread Functions," IEEE Transactions on Ultrasonics, Ferroelectrics, and Frequency Control, vol. 65, No. 3, Nov. 13, 2017, 11 pages.

ISA European Patent Office, International Search Report and Written Opinion Issued in Application No. PCT/EP2019/054539, dated Jun. 4, 2019, WIPO, 13 pages.

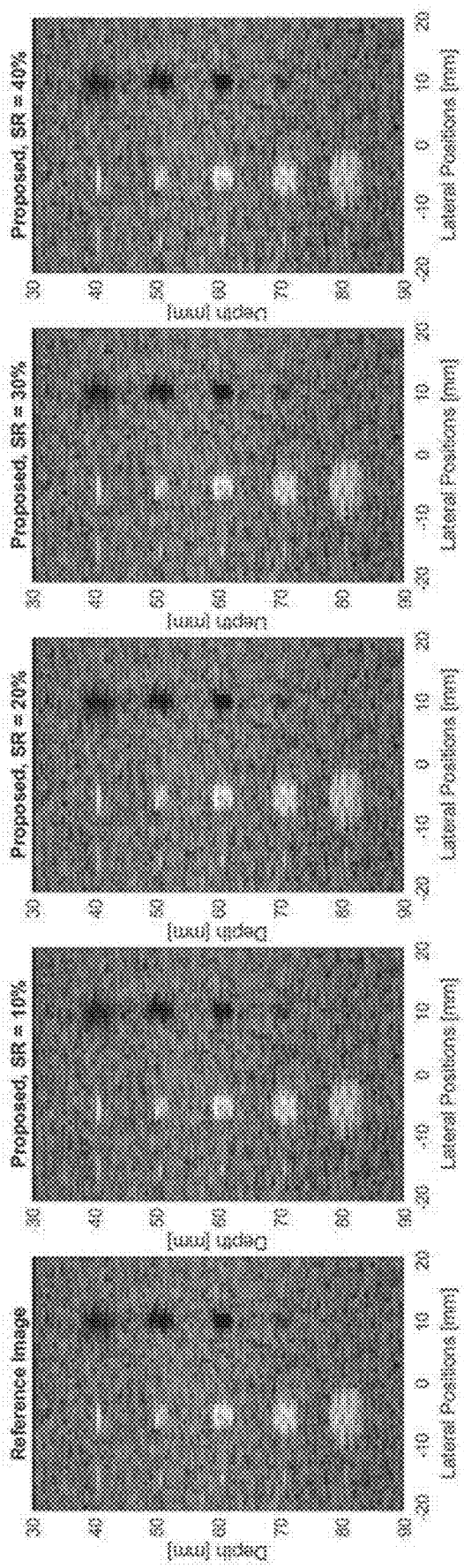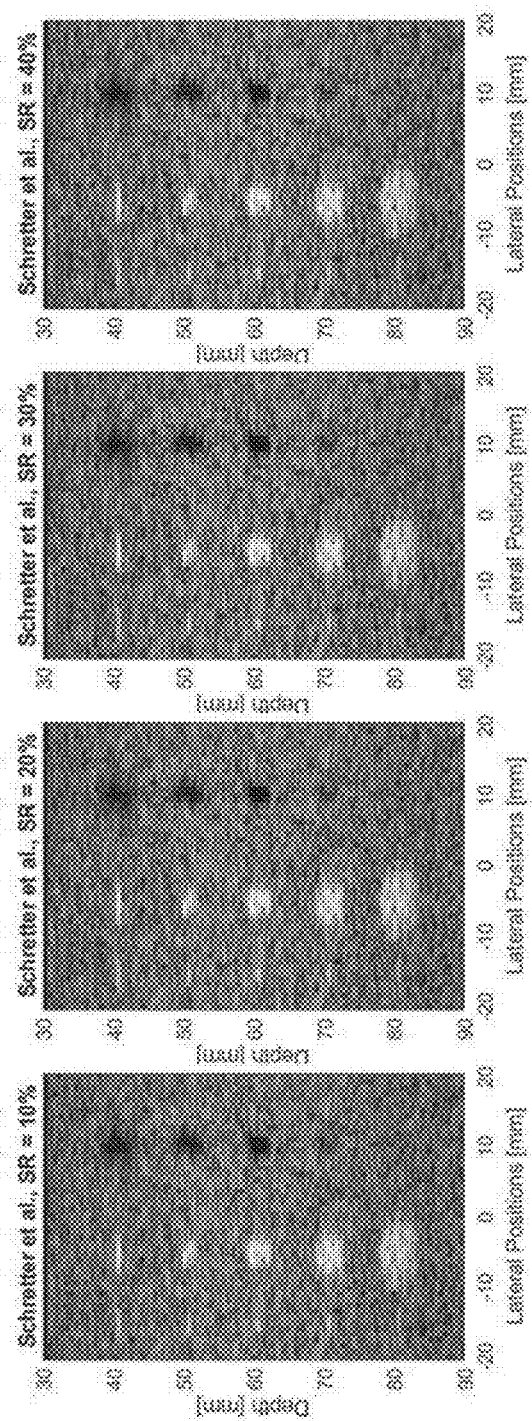
FIG. 5A FIG. 5B FIG. 5C FIG. 5D FIG. 5E

RECONSTRUCTION SYSTEM AND METHOD

CROSS-REFERENCE TO RELATED APPLICATIONS

The present application is a U.S. National Phase of International Patent Application Serial No. PCT/EP2019/054539 entitled "RECONSTRUCTION SYSTEM AND METHOD," filed on Feb. 25, 2019. International Patent Application Serial No. PCT/EP2019/054539 claims priority to United Kingdom Patent Application No. 1802942.1 filed on Feb. 23, 2018. The entire contents of each of the above-referenced applications are hereby incorporated by reference for all purposes.

TECHNICAL FIELD

The present invention is generally related to signal reconstruction. More particularly, the present invention relates to methods and systems for reconstructing a full signal based on a subset of the full signal.

BACKGROUND AND SUMMARY

Ultrasound echography is one of the most used diagnostic imaging techniques as it is real-time, safe, low-cost and noninvasive. Conventional ultrasound imaging is usually performed by scanning a medium using sequential focused beams, each firing allowing the reconstruction of one line of the final image. This is called Single-Line-Transmission (SLT) imaging. Data received by a receiver is commonly called pre-beamformed data, and the reconstructed image based on received data is commonly called a beamformed signal or image. A high-resolution image requires sufficient numbers of transmissions as well as a sampling rate that is significantly higher than the Nyquist rate of the signal. Consequently, with such high sampling rate, and taking into account the number of transmissions and the number of transducer elements, the amount of sampled data can become enormous, which can restrict the data storage and transportation in most of the available commercial systems.

Compressive sensing (CS) theory provides a way of reducing the amount of data. The CS theory shows that if a 1-dimensional signal of length M is sparse or has a sparse representation in a known basis with sparsity k, then it can be recovered from Ms=O(k log M) incoherent samples.

Based on the CS theory, a number of strategies have been proposed to reduce the volume of ultrasound data based on the use of different sparse bases or measurement matrices. Most of the proposed methods can be roughly grouped into two categories. The first allows for reducing the number of transmits and can help to improve the frame rate. However, even if the number of transmissions is reduced, the amount of sampled data is still very large due to the high sampling frequency.

The second group of methods has the aim of reducing the temporal sampling rate. CS is typically applied on individual signals (or a vectorized representation of a 2D signal), as CS-only exploits the intra-signal structure of a one-dimensional signal. A minimum number of required samples Ms=O(k log M) per line has to be respected.

In ultrasound imaging, signals originating from individual sensor array elements in close proximity with each other tend to be highly correlated (close in space). Similarly, the signals from consecutive or near-consecutive ultrasound transmit events tend to be highly correlated (close in time). In distributed compressive sensing (DCS), algorithms have been designed based on the assumption that all of the one-dimensional signals are jointly sparse in a known basis. One method of reducing the number of samples uses the assumption that all the signals to be reconstructed have the same sparse support in the one-dimensional Fourier domain. This hypothesis may be reasonable for some ultrasound signals, as the radiofrequency (RF) signals may be bandlimited by the impulse response of the transducer producing the excitation signal. However, the DCS theory is an extension of CS and the reconstruction accuracy of the DCS algorithm still depends upon the sparse basis. Moreover, the number of measurements per signal cannot be less than the sparsity k.

It has also been proposed to use a low-rank matrix completion (MC) method (i.e. ALOHA, annihilating filtered-based low-rank Flankel matrix approach) which may allow to reduce the number of transmissions in ultrasound signals. Unlike CS, the MC theory directly performs the reconstruction on a matrix. It states that under particular conditions, a matrix which is low-rank can be obtained exactly from a small number of randomly selected entries from the matrix. However, due to the very large size of pre-beamformed RF data, direct application of the MC theory on the pre-beamformed RF data matrix can be time- and memory-expensive.

It is an object of the present invention to provide efficient methods and systems for estimating a signal.

It is an advantage of embodiments of the present invention that the sampling rate required can be significantly reduced, while still obtaining an accurate reconstruction of the full signal. It thus is an advantage of embodiments of the present invention to reconstruct the full signal with little samples. It is an advantage of embodiments of the present invention that a mathematically efficient method an system is obtained, resulting in efficient processing of the data.

It is an advantage of embodiments of the present invention that the volume of pre-beamformed data can be reduced, resulting in saving of the memory space of the system.

The object and optionally one or more advantages are obtained by methods and systems according to the present invention.

In one aspect, the present invention relates to a method for estimating a full signal X from a subset B of the full signal X. The method comprises the steps of:
  receiving a plurality of randomly sampled multichannel radio-frequency signals B or a plurality of randomly sampled in-phase and quadrature signals B acquired from a physical environment comprising a transmitter, the transmitter comprising one or more transmitting elements for emitting ultrasound excitation pressure waves, a propagation medium containing non-uniformities capable of reflecting said pressure waves, and a receiver for receiving the full signal, wherein the receiver comprises one or more receiver elements;
  modelling the full signal X as a matrix comprising a plurality of vector signals, each vector signal corresponding to the full signal incident on a corresponding receiver element, wherein each vector signal comprises a plurality of samples representing the full signal sampled from a corresponding receiver element, wherein each sample comprises a weighted sum of complex sinusoids, wherein the full signal X is expressed as matrix product of a first matrix Y and a second matrix D;
  updating the second matrix D based on an objective function, wherein the objective function is configured to estimate the second matrix D based on the randomly sampled signals B, to produce an updated second matrix D1;

determining a convergence parameter in dependence upon the evaluated objective function; and modifying the updated second matrix D1 in dependence upon the convergence parameter.

The plurality of randomly sampled multichannel radio-frequency or in-phase and quadrature signals B may be received by a receive module configured to record the randomly sampled multi-channel radio frequency or in-phase and quadrature signals B.

It is an advantage of embodiments of the present invention that use is made of a technique using both a joint-sparse property as well as a low-rank property.

It is an advantage of embodiments of the present invention that the full signal can be reconstructed from a small number of samples of the full signal, for example 10% of the full signal), while maintaining image quality. For example, in some embodiments of the present invention described herein, less than 1%, or less than 2%, or less than 5%, or less than 10%, or less than 20%, or less than 50% of samples of a full signal are used for its reconstruction. However, the present invention is not limited to these sampling rates and other sampling rates may be used, for example 50% of samples of a full signal. Thus, the amount of data received in the reconstruction method according to embodiments of the present invention can be greatly reduced, as the full signal X does not need to be received in the method in its entirety, only a subset B of the full signal is required. For example, the method only may receive a subset B of the full signal instead of receiving the full signal. The method may for example be performed by a processing module and the processing module may receive the subset B of the full signal instead of receiving the full signal. It is a further advantage of embodiments of the present invention that the method may store only the subset B of the full signal instead of the full signal. It is a further advantage of embodiments of the present invention that fewer samples can be used to reconstruct the full signal and thus the memory required to store data for reconstructing an image is reduced. For example, the RAM requirements of a device configured to store data for reconstructing a full signal according to embodiments of the present invention is reduced in comparison with that required for known systems and methods.

Modifying the updated second matrix D1 in dependence upon the convergence parameter may comprise comparing the convergence parameter with a predetermined threshold value.

The method may further comprise, if the convergence parameter is greater than the predetermined threshold value, repeating the step of evaluating the objective function for the updated second matrix D1.

The method may further comprise, if the convergence parameter is less than the predetermined threshold value, determining the estimated full signal X in dependence upon the updated second matrix D1 and the first matrix Y.

The method may further comprise outputting the estimated full signal X.

The complex sinusoids may have a finite number k of distinct frequencies.

Each weighted sum may comprise sinusoids at the same k distinct frequencies.

The first matrix Y may comprise the set of k complex sinusoids.

The second matrix D may comprise, for each vector signal, a set of k coefficients corresponding to the complex sinusoids.

The rank of the first matrix X may be less than k.

The transmitter may be configured to emit ultrasound excitation pressure waves having frequencies within a frequency band.

The complex sinusoids may have frequencies within the frequency band.

Estimating the full signal may comprise applying a simultaneous direction method of multipliers. Estimating the full signal may comprise applying a minimizing process of the nuclear norm of the full signal X.

Estimating the full signal may comprise applying a minimizing process of the $l_{21}$ norm of the second matrix D.

The method may further comprise generating an image in dependence upon the estimated full signal X.

The propagation medium containing non-uniformities may comprise a human subject or part thereof.

The invention also relates to a program, executable on a programmable device containing instructions, which when executed, perform the method as described above.

According to a second aspect of the present invention, there is provided a computer program product comprising instructions which, when the program is executed by a computer, cause the computer to carry out a method according to the first aspect.

According to a third aspect of the present invention, there is provided a computer-readable medium comprising instructions which, when executed by a computer, cause the computer to carry out a method according to the first aspect.

According to a fourth aspect of the present invention there is provided an apparatus for performing ultrasound measurements of a propagation medium containing non-uniformities, the apparatus comprising: an ultrasound transducer configured to emit ultrasound excitation pressure waves; a receiver comprising one or more elements for receiving a full signal resulting from reflection of said pressure waves by the non-uniformities, wherein the receiver comprises one or more receiver elements; and a processor configured to receive a set of random samples B of the full signal X or of a demodulated full signal X and to estimate the full signal X from the set of random samples, wherein the full signal can be expressed as a matrix product of a first matrix Y and a second matrix D, wherein the processor is configured to perform the steps of: modelling the full signal X as a matrix comprising a plurality of vector signals, each vector signal corresponding with the full signal incident on a corresponding receiver element, wherein each vector signal comprises a plurality of samples representing the full signal sampled from a corresponding receiver element, wherein each sample comprises a weighted sum of complex sinusoids; updating the second matrix D based on an objective function, wherein the objective function is configured to estimate the second matrix D based on the randomly sampled signals, to produce an updated second matrix D1; determining a convergence parameter in dependence upon the evaluated objective function; and modifying the updated second matrix D1 in dependence upon the convergence parameter.

The propagation medium containing non-uniformities may comprise a human subject or part thereof.

Modifying the updated second matrix D1 in dependence upon the convergence parameter may comprise comparing the convergence parameter with a predetermined threshold value.

The processor may be configured to, if the convergence parameter is greater than the predetermined threshold value, repeat the step of evaluating the objective function for the updated second matrix.

The processor may be configured to, if the convergence parameter is less than the predetermined threshold value, determine the estimated full signal X in dependence upon the updated second matrix DI and the first matrix Y.

The processor may be configured to output the estimated full signal X.

The processor may be configured to generate an image in dependence upon the optimized second matrix D.

The apparatus may further comprise a display module configured to display the image.

Particular and preferred aspects of the invention are set out in the accompanying independent and dependent claims. Features from the dependent claims may be combined with features of the independent claims and with features of other dependent claims as appropriate and not merely as explicitly set out in the claims.

BRIEF DESCRIPTION OF THE FIGURES

Further features of the present invention will become apparent from the examples and figures, wherein:

FIG. 5A illustrates the reference image for the simulated phantom dataset;

FIGS. 5B to 5E illustrate images as reconstructed by a method according to embodiments of the present invention and the method of Schretter et al. for various sampling rates, for the simulated phantom dataset;

DETAILED DESCRIPTION

Figure 1A:
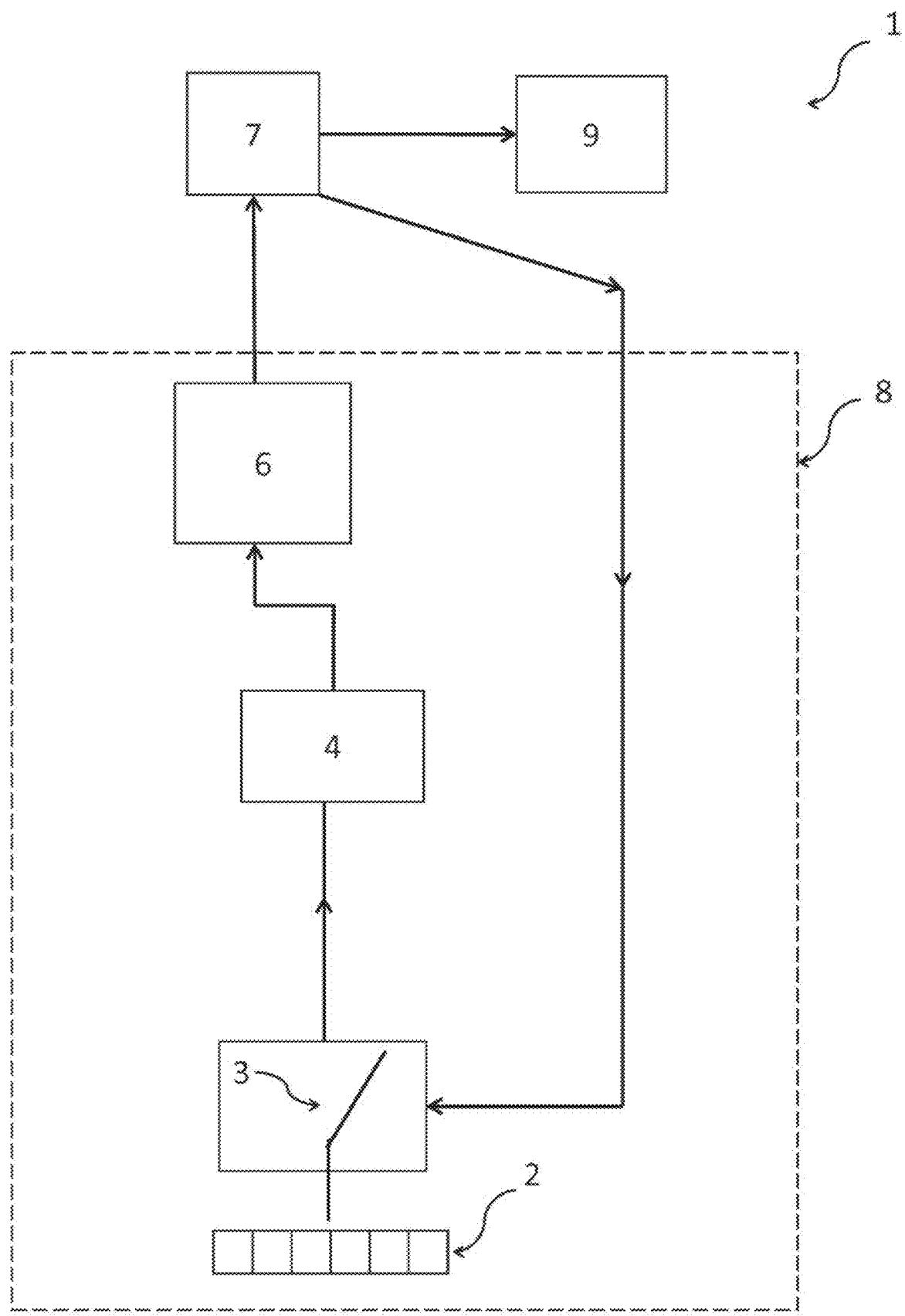
FIG. 1A is a schematic illustration of an ultrasound apparatus according to embodiments of the present invention.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. Where the term "comprising" is used in the present description and claims, it does not exclude other elements or steps. Where an indefinite or definite article is used when referring to a singular noun e.g. "a" or "an", "the", this includes a plural of that noun unless something else is specifically stated. The term "comprising", used in the claims, should not be interpreted as being restricted to the means listed thereafter; it does not exclude other elements or steps. Thus, the scope of the expression "a device comprising means A and B" should not be limited to devices consisting only of components A and B. It means that with respect to the present invention, the only relevant components of the device are A and B. Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein. Moreover, the terms top, bottom, over, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein. In the drawings, like reference numerals indicate like features; and, a reference numeral appearing in more than one figure refers to the same element.

In the illustrated embodiments as well as in the claims, the different data processing and/or data handling steps are expressed using a matrix formalism. Nevertheless, it will be clear for the person skilled in the art that the formalism used (i.e. the matrix formalism) is not limiting for the present invention and that the same data processing and/or data handling steps expressed using a different formalism are equivalent and therefore also fall within the scope of the present invention. One example of an alternative formalism that may be used is a vector formalism, wherein the data is being represented by vectors and wherein data processing and/or data handling can be expressed by corresponding vector operations.

Referring to FIG. 1a, an ultrasound signal acquisition and processing apparatus 1 according to one example of an embodiment of the present invention is shown. In the example, the apparatus 1 comprises a transducer 2 which is configured with a transmitter/receiver switch 3. The transmitter/receiver switch 3 is configured to provide the transducer in a transmitting mode or a receiving mode. When the transducer is in receiving mode, the transducer 2 typically may be connected to an analog-to-digital converter (ADC) 4. The ADC 4 is in communication with a processing element, e.g. a field-programmable gate array (FPGA) element 6. The processing element 6, e.g. FPGA 6 is configured to be connected to a processing module 7 which may be a computer, a microcontroller, a microprocessor. The switch 3 may be in communication with the processing module 7 and the processing module may be configured to control the switch 3, for example by sending a command to the switch 3 to change the configuration of the transducer between from a transmitting mode to a receiving mode and vice versa. Communication between the processing module 7 and the switch 3 may be through a wired or wireless connection, for example a Bluetooth connection, an Ethernet connection, a USB connection, a WiFi connection. It is to be noted that the particular implementation described above is not limiting and that other configurations allowing switching a transducer between a transmitting and receiving mode also may be used. Alternatively, a separate transmitter and receiver could be used.

Figure 1B:
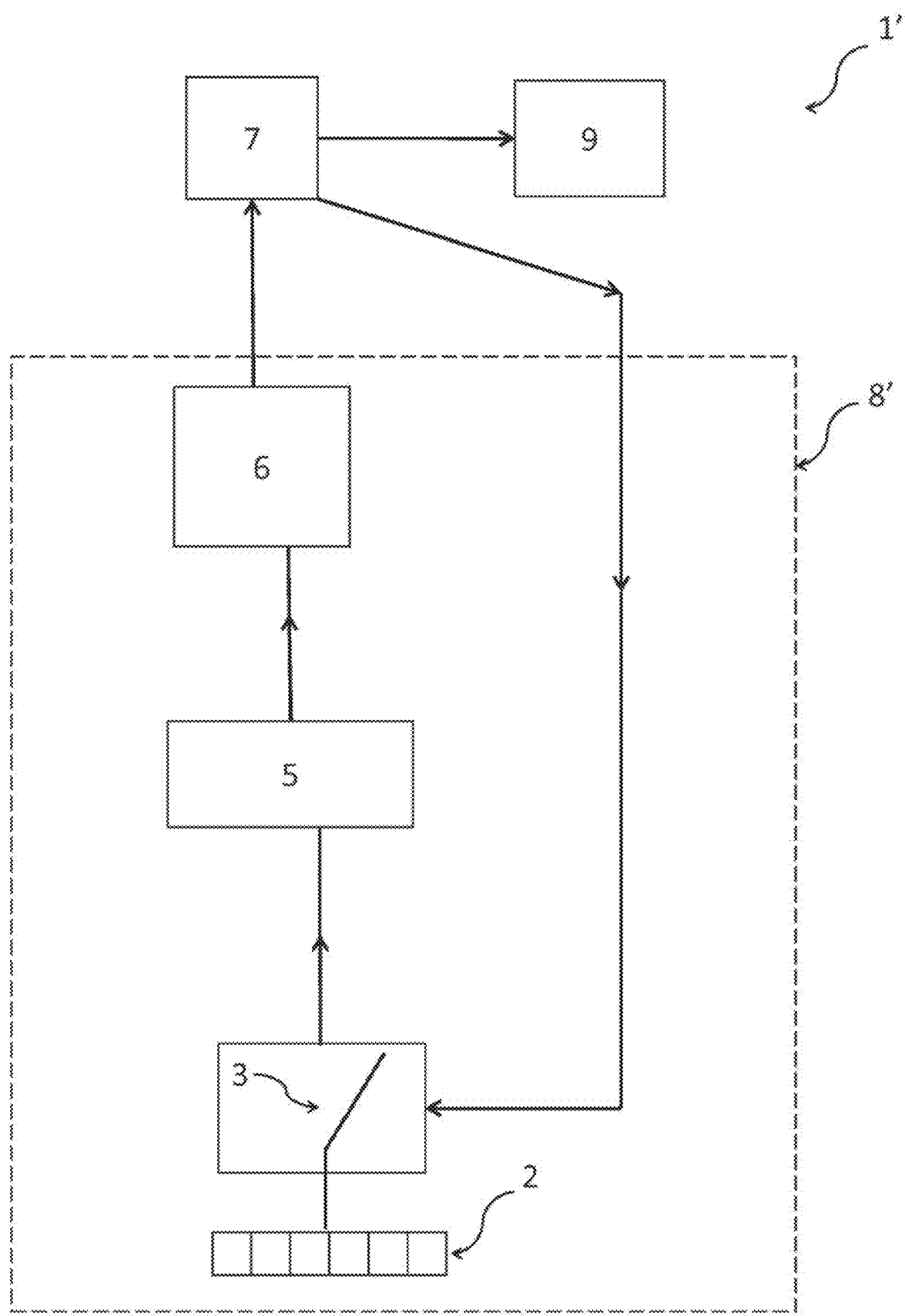
FIG. 1B is a schematic illustration of a modified ultrasound apparatus according to embodiments of the present invention.

Referring to FIG. 1B, in some embodiments a modified apparatus comprises an in-phase and quadrature (IQ) demodulator 5 instead of the ADC 4.

Communication between the processing element 6, e.g. FPGA 6 and the processing module 7 may be through a wired or wireless connection, for example the connection may be a Bluetooth connection, an Ethernet connection, a USB connection, a WiFi connection. Thus, the processing module 7 may be provided at a different physical location to a scanning module 8, in the present example comprising the transducer 2, switch 3, ADC 4, or IQ demodulator 5, and FPGA 6, enabling portable and/or wireless operation of the scanning module 8. For example, the scanning module 8 may be fixed to an object to be subjected to an ultrasound scan, and the processing module 7 may be provided at a different location. In some embodiments, the object may be a human or animal, and the scanning module 8 can remain in place on the object without requiring intervention from an operator. This can allow for continuous monitoring of the object, and can allow the object to move around during, before, and after operation of the scanning module, which can allow for more parameters of the object to be explored during scans. For example, the scanning module 8 may be fixed to the chest of a human and may be configured to perform a cardiovascular scan. The transducer 2 is configured to emit and receive ultrasound excitation pressure waves. The ultrasound waves are directed to a propagation medium (FIG. 2) which contains non-uniformities (FIG. 2) capable of reflecting the ultrasound waves. Analysis of ultrasound waves received by the transducer 2, which may be scattered and/or reflected from the non-uniformities, can provide information on the location, size, and other properties of the non-uniformities. The transducer 2 is configured to convert received ultrasound pressure waves (which may manifest as vibrations of an element of the transducer 2) to a continuous radio-frequency (RE) signal. The continuous signal is provided to the ADC 4 or the IQ demodulator 5. If the continuous signal is provided to the ADC 4, then the ADC 4 converts the continuous (analog) signal to a discretized, digital signal. The signal is converted at a sampling rate/s. The digitized RE signal is then provided to the FPGA 6.

If the continuous signal is provided to the IQ demodulator 5, then the IQ demodulator 5 demodulates the continuous signal at a demodulation rate fc. The resulting demodulated digitized IQ signal is then provided to the FPGA 6.

The FPGA 6 is configured to receive a digital input signal from the ADC 4 or the IQ demodulator 5. The FPGA 6 may be configured to perform random sampling of the input signal and provides the randomly sampled signal, which has fewer samples than the input signal, to the processing module 7. Thus, the time required to transfer image data (in this case, the randomly sampled signal) between the FPGA 6 and the processing module 7 is decreased in comparison with a case where the entire digital input signal is provided to the processing module 7. Furthermore, the memory (e.g. RAM) requirements of the processing module 7 are less, as it is required to store less data (as received from the FPGA 6). However, data is lost in the random sampling process. Thus, embodiments of the present invention provide methods of reconstructing a full signal from a randomly sampled signal, such that a reduced number of samples of the full signal is required to be transmitted from the full signal receiving element (for example, the transducer 2) to the processing module 7.

In some embodiments of the present invention, in ultrasound apparatus 1, the ADC 4 is not provided and the continuous signal is provided directly to the FPGA 6. The FPGA 6 is configured to receive the continuous input signal and to randomly sample the continuous input signal and to provide the randomly sampled signal to the processing module 7.

The apparatus 1 may comprise a display module 9 configured to display an image provided by the processing module 7, the image being a reconstruction of the full signal X as obtained according to embodiments of the present invention.

The transducer 2 may comprise a separate transmitter and receiver or may comprise an integrated transmitter and receiver. In the following, where a transmitter is referred to, it will be understood that this includes a transducer, and where a receiver is referred to, it will be understood that this includes a transducer.

Figure 2:
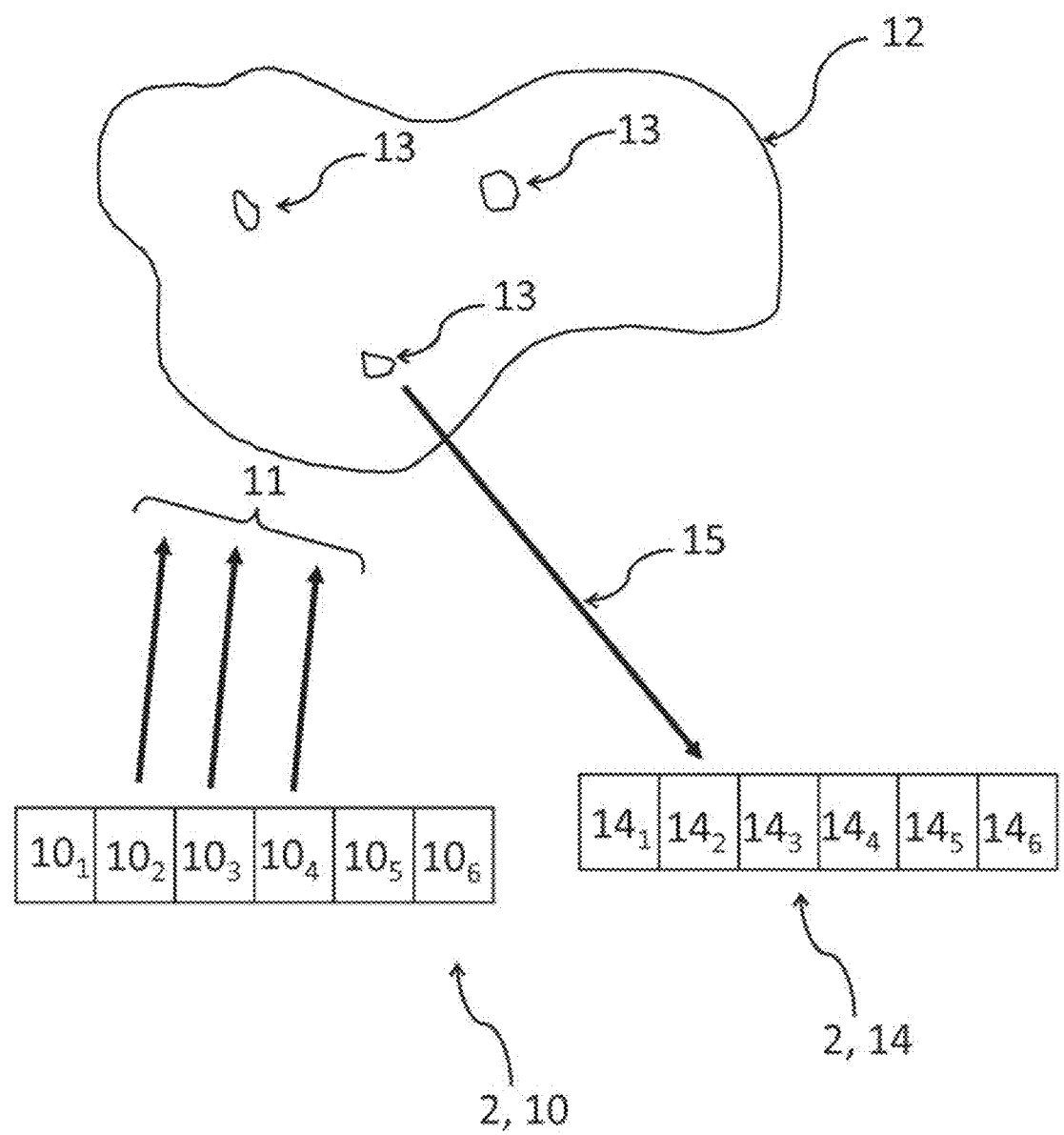
FIG. 2 is a schematic representation of the operation of an ultrasound transducer in scanning a medium.

Referring to FIG. 2, the transmitter 2, 10 preferably comprises a plurality of transmitting elements $10_1$, $10_2$, $10_3$, $10_4$, $10_5$, $10_6$ for emitting ultrasound excitation pressure waves 11. The ultrasound excitation pressure waves propagate through the propagation medium 12 and may be reflected by one or more non-uniformities 13 present in the propagation medium 12. The receiver 2, 14 includes a plurality of elements 14₁, 14₂ for receiving reflected pressure waves 15 which take the form of radio frequency signals. Each receiver element is substantially responsive to signals having frequencies within a particular bandwidth and substantially non-responsive to signals having frequencies outside of that bandwidth. Such frequency response may be substantially the same for each element. The receiver 2, 14 has a bandwidth for receiving signals which is spanned by the combined frequency responses of each of the receiver elements and thus acts as a filter, being substantially responsive only to frequencies within the receiver bandwidth. The transducer 2, transmitter 10, and/or receiver 14 may comprise a linear array of piezoelectric crystals which are capable of responding to an electric input by expanding or contracting. Sound or vibrations can be produced or recorded by exciting or recording the electric impulses from crystals. The resulting change in pressure then propagates through the propagation medium. This pressure wave does not follow a straight line, but instead radiates outwards away from the element illuminating all scatterers within the propagation medium, which is undesirable. Therefore, it may be required that multiple elements are activated in sequence so that the interference of their pressure waves results in an acoustic beam, which only illuminates a region close to a line of interest (image line). In order to increase the Signal to Noise Ratio (SNR) of the measured reflected acoustic waves multiple elements are preferably used when receiving and averaging out the data over all elements.

It is to be understood that the above described apparatus only is one example of an apparatus that can be used in embodiments according to the present invention and that an apparatus according to embodiments of the present invention is not limited thereby. Rather an apparatus according to embodiments of the present invention distinguishes by the way the processing of data is performed, e.g. in the processing element and/or the processing module, and optionally by the amount of data that is received and/or stored and/or processed. The processing of data performed according to embodiments of the present invention will be described with respect to a corresponding method in the following part. The processing element and/or processing module in an apparatus according to embodiments of the present invention is programmed or configured for performing steps accordingly. Undersampling means sampling of a bandpass-filtered signal at a sample rate that is lower than the original sampling rate. For example, in some embodiments of the present invention described herein, 5%, 10%, or 20% of samples of a full signal are used for its reconstruction. However, the present invention is not limited to these sampling rates and other sampling rates may be used, for example 50% of samples of a full signal.

Herein, where a "full signal" is referred to, this means a signal that has not been undersampled, for example the signal transferred to the FPGA before undersampling. The full signal may comprise a digitized form of a continuous RF signal with a certain sampling frequency or a digitized form of in-phase and quadrature signal.

Methods for reconstructing the full signal from the randomly sampled signal according to embodiments of the present invention will be described in the following.

According to embodiments of the present invention, a method for estimating a full signal X from a subset B of the full signal is disclosed. The method comprises receiving a plurality of randomly sampled multichannel radio-frequency or in-phase and quadrature signals acquired from a physical environment comprising a transmitter, the transmitter comprising one or more transmitting elements for emitting ultrasound excitation pressure waves, a propagation medium containing non-uniformities capable of reflecting said pressure waves, and a receiver for receiving the full signal, wherein the receiver comprises one or more receiver elements. It further comprises modelling the full signal X as a matrix comprising a plurality of vector signals, each vector signal corresponding to the full signal incident on a corresponding receiver element, wherein each vector signal comprises a plurality of samples representing the full signal sampled from a corresponding receiver element, wherein each sample comprises a weighted sum of complex sinusoids, wherein the full signal X is expressed as a matrix product of a first matrix Y and a second matrix D. The method also comprises updating the second matrix D based on an objective function, wherein the objective function is configured to estimate the second matrix D based on the randomly sampled signals, to produce an updated second matrix DI. It further comprises determining a convergence parameter in dependence upon the evaluated objective function and modifying the updated second matrix D1 in dependence upon the convergence parameter.

By way of illustration, embodiments of the present invention not being limited thereto, exemplary reconstruction methods will be illustrated below. As indicated above, whereas the present example is shown using matrix algebra for expressing the data processing performed, embodiments of the present invention are not limited thereto and also encompass methods and systems performing the same data processing but based on another mathematical formalism. Although not being limited thereto, one alternative example may be a vector formalism wherein data is represented as vectors and wherein data processing is expressed using corresponding vector operations.

Low-Rank and Joint-Sparse Model of Full Signal

The full signal is represented by a two-dimensional matrix $X \in R^{M \times n}$. For each channel n=1, 2, ... N, we denote $x_n$ as a vector signal of M samples. Each receiver element may transmit and receive signals several times during the process of acquisition of the full signal X and each channel corresponds to a signal received by a particular receiver element at a particular point in time. The number of receiver elements is fixed, but the number of received column signals $x_n$, is not. This depends on the number of elements of the transducer and the number of transmissions. Thus each channel is associated with only one particular receiver element, but each receiver element may be associated with more than one channel.

All the RF channel signals $x_n$ (n=1, N) are sparse and also joint-sparse in the Fourier domain with a sparsity of k, where k is much less than M i.e. k«M. This means that each element $x_n(m)$ can be modelled as a weighted sum of complex sinusoids at k distinct frequencies $f_i$, with $1 \le i \le k$, according to equation 1:

$$x_n(m) = \sum_{i=1}^{k} d_{i,n} e^{j2\pi f_i m} = \sum_{i=1}^{k} d_{i,n} y_i^m, \ 0 \le m < M \quad (1)$$

where for any i, $y_i$ is defined as $y_i = e^{j2\pi f_i}$. The full signal matrix X may then be represented as a matrix product according to equation 2:

$$X = YD$$

The full signal matrix X is expressed as the product of a first matrix Y and a second matrix D. In some embodiments, the first matrix Y is written according to equation 3:

$$Y = \begin{pmatrix} 1 & 1 & \cdots & 1 \\ y_1 & y_2 & \cdots & y_k \\ \vdots & \vdots & \vdots & \vdots \\ y_1^{M-1} & y_1^{M-1} & \cdots & y_k^{M-1} \end{pmatrix}_{M \times k} \quad (3)$$

and the second matrix D is written according to equation 4:

$$D = \begin{pmatrix} d_{1,1} & d_{1,2} & \cdots & d_{1,N} \\ d_{2,1} & d_{2,2} & \cdots & d_{2,N} \\ \vdots & \vdots & \vdots & \vdots \\ d_{k,1} & d_{k,2} & \cdots & d_{k,N} \end{pmatrix}_{k \times N} \quad (4)$$

The factorization form of equation (2) implies a low-rank structure of X according to equation 5:

$$\text{rank}(X) \leq k \quad (5)$$

where $\text{rank}(X) \leq k$ if and only if the second matrix D is full-rank, that is, the k rows of D are independent. In practice, thanks to the strong correlation between ultrasound signals from adjacent or near-adjacent receiver elements, and between ultrasound signals of previous or following timesteps, it is often the case that $\text{rank}(X) \ll k$. For example, for the simulated phantom dataset of FIG. 5, the size of X are M=1946 and N=3200, the sparsity k=546 and rank(X) is approximately 400. Then the full signal matrix X has low-rank and joint-sparse properties when the number N of channels n is greater than rank(X). In the field of ultrasound, this condition is generally satisfied with $N \gg \text{rank}(X)$, implying that the low-rank and joint-sparse property can be exploited in ultrasound signal reconstruction. Embodiments of the present invention provide a method of reconstructing a full signal which is low-rank and joint-sparse. Joint-sparse means that all the 1D signals have non-zero coefficients in a particular basis at the same positions, but with different values. In some embodiments, the basis is a 1D Fourier basis and the signal is joint-sparse in real space and Fourier space, but the present invention is not limited thereto.

An additional characteristic of transmitted ultrasound signals is that a transducer configured to produce such ultrasound signals may have a bandpass characteristic, which results in the ultrasound signals being bandlimited around a centre frequency of a pulse generated by the transducer. This results in a limited range of frequencies of the transmitted and reflected ultrasound signals. Thus the frequencies $f_i$ of equation (1) may be known frequencies, that is, frequencies within the set of frequencies that the transducer is capable of producing. In this case, the first matrix Y can be constructed using such a set of frequencies.

Signal Reconstruction Model

The undersampled received signals B are modelled as a subset of the elements of X, contaminated with random noise, according to equation 6:

$$B = P_\Omega(X) + N_e \quad (6)$$

where $\Omega$ is a set of locations indicating that a signal $x_n(m)$ is observed if and only if $(m,n) \in \Omega$, $P_\Omega(X)$ represents the corresponding elements of X at the locations defined by $\Omega$, and N is an additive random noise term. Thus, the reconstruction problem is to solve equation (6) for X, given the undersampled received signals B, under the condition that X is low-rank and joint-sparse.

This problem can be reformulated as an unconstrained optimization problem according to equation 7:

$$\hat{X} = \underset{X}{\text{argmin}} \|X\|_* + \alpha \|Y_t X\|_{2,1} + \frac{1}{2\mu} \|B - P_\Omega(X)\|_F^2 \quad (7)$$

where $\|X\|_* = \in_i \sigma_i$ is the sum of the singular values (i.e. the nuclear norm) that aims to impose the low-rank property of the full signal X. $Y_t$ is the adjoint operator of the first matrix Y with the relation $Y_t X = D$. In some embodiments, the first matrix Y and its adjoint $Y_t$ are the Inverse Fourier and Fourier matrices with effective frequencies $f_i$. An effective frequency is one which is within the bandwidth of the receiver. The second term $\|Y_t X\|_{2,1}$, is equal to $\Sigma_q^k \|D^{q \rightarrow}\|_{2,1}$, that is, the $l_{2,1}$ norm, and is used to explore the joint sparsity property of X. $q \rightarrow$ denotes the q-th row of $Y_t X$. The symbol $\|A\|_F$ denotes the Frobenius norm of a matrix A. The parameters $\alpha$ and $\mu$ provide for a trade-off between the nuclear norm term $\|X\|_*$, the $l_{2,1}$ norm term $\|Y_t X\|_{2,1}$, and the data consistency term $\|B - P\mu(X)\|_F^2$. The aim of the reconstruction of the full signal X is to find a 2D matrix with minimum rank and joint-sparsity subject to a good fit with the undersampled received signals B.

The present invention achieves this objective by first estimating the second matrix D, instead of the full signal X, directly from the received signals B, according to equation 8:

$$\hat{D} = \underset{D}{\text{argmin}} \|YD\|_* + \alpha \|D\|_{2,1} + \frac{1}{2\mu} \|B - P_\Omega(YD)\|_F^2 \quad (8)$$

The second matrix D is a k×N matrix with k≪M, which means that the number of variables to be estimated in D is M/k times less than the number of variables to be estimated in X. Thus, it is an advantage of embodiments of the present invention that the full signal X can be estimated from a set of undersampled signals, which simplifies the optimization problem of equation (7). This is because a smaller matrix D requires less memory for computing and allows for a faster optimization process. For the same samples, the smaller the matrix to be estimated, the higher the achieved accuracy.

Optimization and Implementation

In some embodiments, to solve the optimization problem of equation (8), an adapted simultaneous direction method of multiplied (SDMM) optimization framework is used.

The optimization problem (8) may be reformulated as a sum of convex functions of matrices according to equation 9:

$$\underset{D}{\text{argmin}} g_1(w_1) + g_2(w_2) + g_3(w_3) \quad (9)$$

with parametrization according to equations 9.1:

$$\begin{cases} g_1(w_1) = \|w_1\|_* \\ g_2(w_2) = \alpha \|w_2\|_{2,1} \\ g_3(w_3) = \frac{1}{2\mu} \|B - P_\Omega(w_3)\|_F^2 \\ w_1 = YD \\ w_2 = D \\ w_3 = YD \end{cases} \quad (9.1)$$

Using the parametrization of equations 9.1, the optimization problem according to equation (9) can be iteratively solved using a SDMM-based method or algorithm as follows.

D is updated according to equation 10:

$$D^{s+1} = \arg\min_D \frac{1}{2\gamma} \left\| \begin{pmatrix} b_1^s \\ b_2^s \\ b_3^s \end{pmatrix} + \begin{pmatrix} Y \\ I \\ Y \end{pmatrix} D - \begin{pmatrix} w_1^s \\ w_2^s \\ w_3^s \end{pmatrix} \right\|_F^2 \quad (10)$$

where $b_1$, $b_2$, and $b_3$ are Lagrangian parameters having the same dimensions as $w_1$, $w_2$, and $w_3$ respectively. $\gamma$ is a penalty parameter which is greater than zero. $\gamma$ influences the number of iterations of the optimization algorithm, and can also influence the final result, as it is used in equations (13) and (15) to minimize the nuclear norm and the $l_{2,1}$ norm, respectively. As will be discussed hereinafter, y can be chosen so as not to influence the final result.

Equation 10 is a classical $l_2$ norm minimization problem. This type of problem can be efficiently solved in the Fourier domain, for example as described in "Solving Constrained Total-variation Image Restoration and Reconstruction Problems via Alternating Direction Methods", M. Ng et al., SIAM J. Sci. Comput, 32(5), 2710-2736.

The $w_i$ are solved according to equation 11:

$$\begin{pmatrix} w_1^{s+1} \\ w_2^{s+1} \\ w_3^{s+1} \end{pmatrix} = \arg\min_{w_1, w_2, w_3} \left\{ \frac{1}{2\gamma} \left\| \begin{pmatrix} b_1^s \\ b_2^s \\ b_3^s \end{pmatrix} + \begin{pmatrix} Y \\ I \\ Y \end{pmatrix} D^{s+1} - \begin{pmatrix} w_1 \\ w_2 \\ w_3 \end{pmatrix} \right\|_F^2 + \sum_{i=1}^3 g_i(w_i) \right\} \quad (11)$$

Due to the separate structure of equation 11 (that is, the independence of the individual rows of the column vectors of equation 11), the equation can be solved by minimizing three subproblems that correspond to the update of $w_1$, $w_2$, and $w_3$ respectively, as follows. $w_1$ is updated according to equation 12:

$$w_1^{s+1} = \arg\min_{w_1} \|w_1\|_* + \frac{1}{2\gamma} \|b_1^s + YD^{s+1} - w_1\|_F^2 \quad (12)$$
$$= \arg\min_{w_1} \gamma \|w_1\|_* + \frac{1}{2} \|b_1^s + YD^{s+1} - w_1\|_F^2$$

This is the Matrix Completion problem whose solution is given by shrinking the singular values of $b_i^s + YD^{s+1}$, according to equation 13:

$$w_1^{s+1} = US(\Sigma, \gamma)V^T \quad (13)$$

where U V T is the Singular Value Decomposition (SVD) of $b_i^{s+1}$ S(a, b)=sgn (a) (|a|−b) for |a|≥b and zero otherwise. $w_2$ is updated according to equation 14:

$$w_2^{s+1} = \arg\min_{w_2} \alpha \|w_2\|_{2,1} + \frac{1}{2\gamma} \|b_2^s + D^{s+1} - w_2\|_F^2 \quad (14)$$
$$= \arg\min_{w_2} \alpha\gamma \|w_2\|_{2,1} + \frac{1}{2} \|b_2^s + D^{s+1} - w_2\|_F^2$$

Due to the separate structure of the $l_{2,1}$ norm, this problem can be solved by minimizing each row of $w_2$ separately. Let $P = b_2^s + D^{s+1}$, and represent the i-th row of matrix P as $p^i$, and the i-th row of matrix $w_2^{s+1}$ as $w_2^{i,s+1}$. The closed form solution for each row of $W_2^{k+1}$ is given according to equation 15:

$$w_2^{i,s+1} = \left(1 - \frac{\alpha\gamma}{\|p^i\|_2}\right)_+ p^i \quad (15)$$

where the symbol (v)+ denotes a vector with entries receiving values of max($v_j$, 0). That is, for each row of $w_2^{s+1}$, if the ith element of the bracket of equation 15 is less than zero, then this element is replaced with zero. If the ith element of the bracket is more than zero, this element is used to multiply $p^i$.

$w_3$ is updated according to equation 16:

$$w_3^{s+1} = \arg\min_{w_3} \frac{1}{2\mu} \|B - P_\Omega(w_3)\|_F^2 + \frac{1}{2\gamma} \|b_3^s + YD^{s+1} - w_3\|_F^2 \quad (16)$$

Equation 16 can be solved by setting the first-order derivative with respect to $W_3$ equal to zero. Furthermore, $w_3^{s+1}$ can be expressed as a summation of two sub-matrices $P_\Omega(w_3^{s+1})$ and $P_{\bar\Omega}(w_3^{s+1})$ where $P_{\bar\Omega}(w_3^{s+1})$, represents the values of $w_3^{s+1}$ at locations not in the set of locations defined by $\Omega$, according to equation 17:

$$w_3^{s+1} = P_\Omega(w_3^{s+1}) + P_{\bar\Omega}(w_3^{s+1}) \quad (17)$$

where $P_\Omega(w_3^{s+1})$ and $P_{\bar\Omega}(w_3^{s+1})$ are given according to equations 18

$$\begin{cases} P_\Omega(w_3^{s+1}) = (\gamma P_\Omega(B) + \mu P_\Omega(b_3^s + YD^{s+1}))/(\gamma + \mu) \\ P_{\bar\Omega}(w_3^{s+1}) = P_{\bar\Omega}(b_3^s + YD^{s+1}) \end{cases} \quad (18)$$

The Lagrange parameters are then updated according to equation 19:

$$\begin{pmatrix} b_1^{s+1} \\ b_2^{s+1} \\ b_3^{s+1} \end{pmatrix} = \begin{pmatrix} b_1^s \\ b_2^s \\ b_3^s \end{pmatrix} + \begin{pmatrix} Y \\ I \\ Y \end{pmatrix} D^{s+1} - \begin{pmatrix} w_1^{s+1} \\ w_2^{s+1} \\ w_3^{s+1} \end{pmatrix} \quad (19)$$

A convergence parameter $\eta$ is evaluated according to $$\frac{\|D^s - D^{s-1}\|}{\|D^{s-1}\|}.$$

If the convergence parameter $\eta$ is greater than a predetermined value, the algorithm returns to the step of updating D according to equation 10 and repeats the following steps. If the convergence parameter 11 is less than the predetermined value, the algorithm terminates and D is provided as output.

The SDMM-based numerical scheme for solving equation 8 can thus be summarized as in Table 1:

TABLE 1

Algorithm for solving equation (8)

Figure 3:
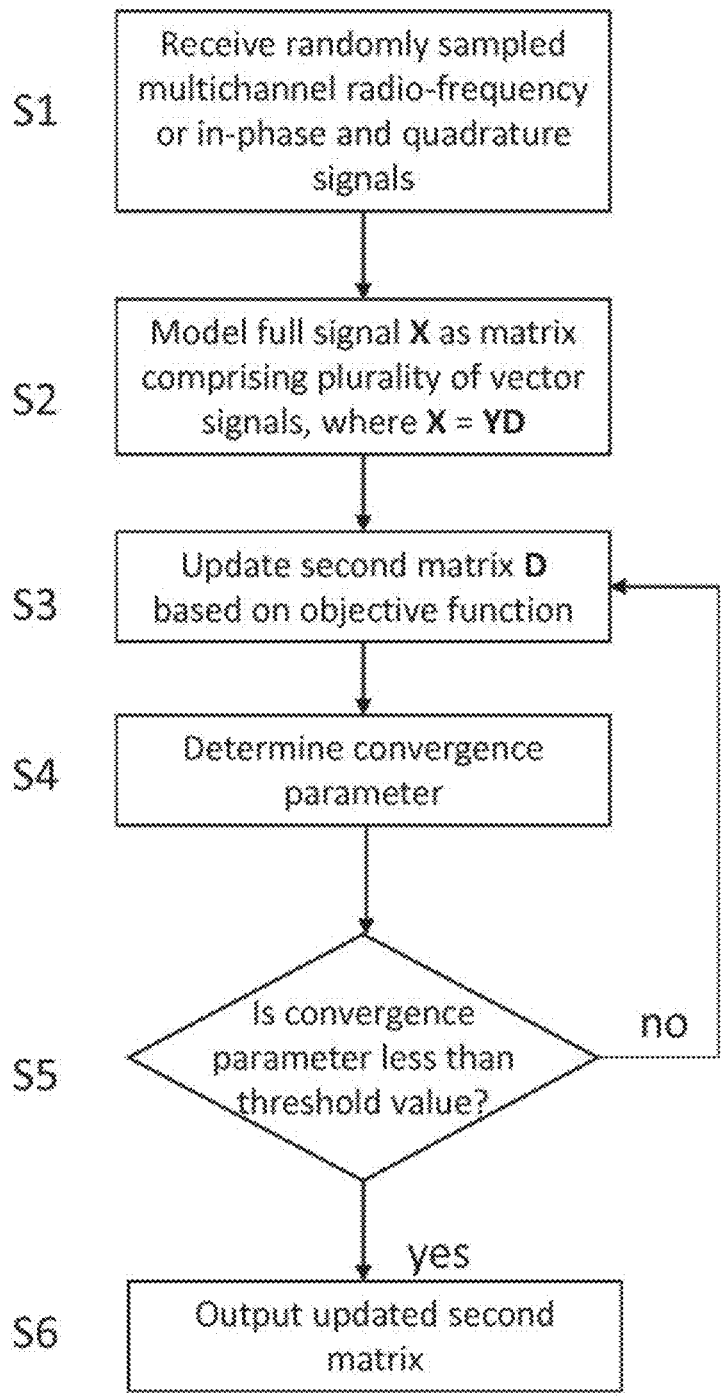
FIG. 3 is a flowchart of a method according to embodiments of the present invention.

Input: B, Y, $P_\Omega$, $\gamma$, $\alpha$, $\mu$
Initialization: $b_i^s$, $w_i^s$, i = 1, 2, 3
while not converged do
    $D^{s+1} \Leftarrow b_i^s, w_i^s$     ☐ update $D^{s+1}$ using (10)
    $w_1^{s+1} \Leftarrow b_1^s, D^{s+1}$     ☐ update $w_1^{s+1}$ using (13)
    $w_2^{s+1} \Leftarrow b_2^s, D^{s+1}$     ☐ update $w_2^{s+1}$ using (15)
    $w_3^{s+1} \Leftarrow b_3^s, D^{s+1}$     ☐ update $w_3^{s+1}$ using (17)
    $b_i^{s+1} \Leftarrow b_i^{s+1}, D^{s+1}, w_i^{s+1}$     ☐ update $b_i^{s+1}$ using (19)
end while
Output: D Referring to FIG. 3, a flowchart of a method of reconstructing a full signal X according to embodiments of the present invention is shown.

A plurality of randomly sampled multichannel radio-frequency or in-phase and quadrature signals B are received (step SI), for example by the processing module 7 of FIG. 1. The randomly sampled signals are signals acquired from a physical environment comprising a transmitter, a propagation medium, and a receiver. In some embodiments the receiver and the transmitter are a single unit, for example a transducer. The transmitter comprises one or more transmitting elements for emitting ultrasound excitation pressure waves. The propagation medium contains non-uniformities capable of reflecting the ultrasound excitation pressure waves. For example, in some embodiments, the propagation medium comprises a part of a human body. In some embodiments, the propagation medium comprises a human or animal heart. The propagation medium may comprise a part of a heart, for example one or more chambers of the heart.

The receiver is configured to receive the full signal X and comprises one or more receiver elements. The full signal X is modelled as a matrix comprising a plurality of vector signals (step S2). Each vector signal corresponds to a portion of the full signal incident on a corresponding receiver element. Each vector signal comprises a plurality of samples and each sample comprises a weighted sum of complex sinusoids (equation 1). The full signal X is expressed as a matrix product of a first matrix Y and a second matrix D (equation 2). The second matrix D may be initialized as a matrix of zeros, however any appropriate initial value may be used.

The second matrix D is updated based on an objective function (step S3), producing an updated second matrix DI. The objective function is a function configured to update the second matrix D based on the randomly sampled signals. The objective function may be, for example, according to equation 8.

A convergence parameter is determined in dependence upon the second matrix D and the updated second matrix DI (step S4). The convergence parameter is compared with a predetermined threshold value (step S5). If the convergence parameter is above a predetermined threshold value, then the process returns to step S3 and the updated second matrix DI is used as the second matrix to be updated. If the convergence parameter is below a predetermined threshold, the updated second matrix D1 is provided as output (step S6). Thus, the updated second matrix is modified in dependence upon the convergence parameter, because the choice of whether to modify the updated second matrix is dependent on the convergence parameter. That is, if the convergence parameter is above a predetermined value, the updated second matrix is subsequently modified by returning to step S3, and if the convergence parameter is below a predetermined value, the updated second matrix is not modified.

For the first determination of the convergence parameter in step S4, the convergence parameter is determined in dependence upon the initialized second matrix D. In subsequent iterations of step S4, for a given iteration step identified by an index s, the second matrix to be updated in step S3 is denoted as $D_{s-1}$ (this being the updated matrix resulting from step S3 in the preceding iteration step s-1) and the resulting updated second matrix obtained in step S4 of iteration s is denoted as $D_s$. The convergence parameter is determined in dependence upon $D_{s-1}$ and $D_s$.

The performance of the hereinbefore-described method according to embodiments of the present invention was evaluated on conventional single-line-transmission (SLT). The method according to embodiments of the present invention was first tested on linear images and compared to method proposed by Schretter et al., "*Ultrasound imaging from sparse rf samples using system point spread functions*", IEEE Transactions on Ultrasonics, Ferroelectrics, and Frequency Control, 2017. The method was then evaluated on SLT sectorial images of the heart in vivo.

For the experiments described hereinafter, the algorithm terminates if the convergence factor $\eta$ (as evaluated in step S4) is less than $5 \times 10^{-5}$ and the parameters $\alpha$, $\gamma$, $\mu$ are obtained through a cross-validation process. First $\alpha$ and $\mu$ are fixed and $\gamma$ is optimized to find the smallest reconstruction error. Then using this optimal value of $\gamma$, $\mu$ is fixed and $\alpha$ is optimized to find the smallest reconstruction error. Finally, using the optimal values of $\gamma$ and $\alpha$, $\mu$, is optimized to find the smallest reconstruction error. These parameters were set to $\{\gamma, \alpha, \mu\} = \{1, 0.1, 1e^{-6}\}$ for linear images and $\{\gamma, \alpha, \mu\} = \{1, 0.01, 1e^{-6}\}$ forsectorial images. The bandwidth of the datasets was assumed to be 1 for the purpose of determining the first dimension of D, i.e. the estimated sparsity k of the full signal in the Fourier basis. A bandwidth of 1 in this context means that the frequencies comprised in the datasets span from 0.5 $f_c$ to 1.5 $f_c$, where $f_c$ is the centre frequency. For example, a bandwidth of 0.8 would mean that the frequencies are within the range 0.6 $f_c$ to 1.4$f_c$. The acquired pre-beamformed RF data were normalized before performing sparse sampling.

Linear Images
1. Simulation Results

The method was evaluated on the same simulated and experimental datasets as used by Schretter et al., "Ultrasound Imaging From Sparse RF Samples Using System Point Spread Functions", DOI 10.1109/TUFFC.2017.2772916, IEEE Transactions on Ultrasonics, Ferroelectrics, and Frequency Control. The parameters of acquisitions are shown in Table 2.

TABLE 2

Linear image experimental settings

| Parameters | Simulation | Acquisition |
|---|---|---|
| Center frequency ($f_0$) | 3.5 MHz | 7 MHz |
| Sampling frequency ($f_s$) | 25 MHz | 40 MHz |
| Focal depth | 60 mm | 30 mm |
| Number of probe elements | 192 | 128 |
| Elements width | 0.44 mm | 0.46 mm |
| Elements height | 5 mm | 4 mm |
| Elements kerf | 0.05 mm | 0.012 mm |
| Number of active elements in transmission | 64 | 32 |
| Number of active elements in reception | 64 | 32 |
| Apodization in reception | Hanning | Hanning |

For the purposes of comparison, the same non-uniform importance sampling strategy was used as that of Schretter et al., which is consistent with Planning receive apodization.

To quantify the reconstruction error, the normalized root-mean-square error (NMRSE) of beamformed RF image was calculated according to equation 20:

$$NRSME = \frac{\sqrt{\frac{1}{M_b N_f} \sum_{b=1}^{M_b} \sum_{f=1}^{N_f} (l'(b,f) - l(b,f))^2}}{\max_{b,f} |l(b,f)|} \quad (20)$$

where l(b,f) and l'(b, f) denote the beamformed RF image from the original dataset and the reconstructed dataset, respectively (where the reconstructed dataset may be obtained according to methods of the present invention or methods described in Schretter et al.). Mb and Nf denote the number of samples along the depth and lateral dimensions of the image respectively.

Figure 4:
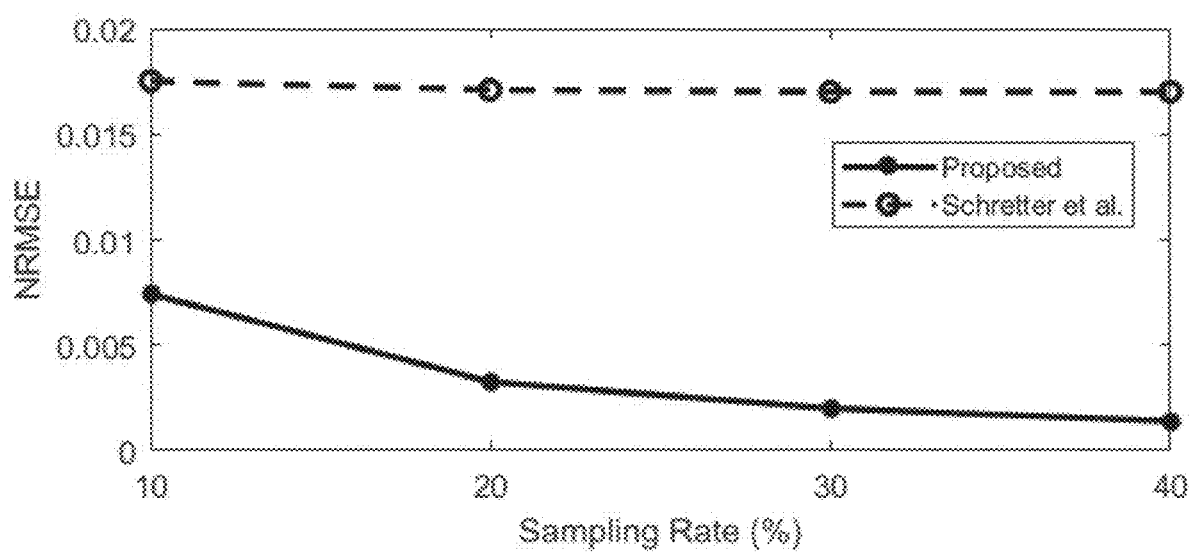
FIG. 4 is a plot of the NRMSE of reconstructed beamformed RF images as a function of sampling rate (SR), for the method of Schretter et al. and for a method according to embodiments of the present invention, the reconstruction being based on a simulated phantom dataset.

Referring to FIG. 4, the NRMSE of the beamformed RE images is shown as a function of sampling rates (SR) for the simulated dataset, corresponding to a non-in vivo medium or phantom. It can be seen that the method according to embodiments of the present invention. outperforms the method of Schretter et al. (i.e., has a lower NRMSE) for all sampling rates. In particular, it can be observed that even with a sampling rate of 10%, the method according to embodiments of the present invention can almost totally recover the whole image with an error of less than 1%. It is also worth noting that, for the simulated phantom dataset, the sparsity k of the signal is approximately $$M^{\frac{2f_c}{f_s}} = 0.28\, M,$$

where M is the number of time samples of the signal. Put differently, the sparsity is approximately 28% of the signal length. Thus for total recovery of the full signal, the sampling rate cannot be lower than 28% for CS-based strategies, whereas for methods according to embodiments of the present invention almost the whole signal can be recovered with a sampling rate of 10%.

Figure 6A:
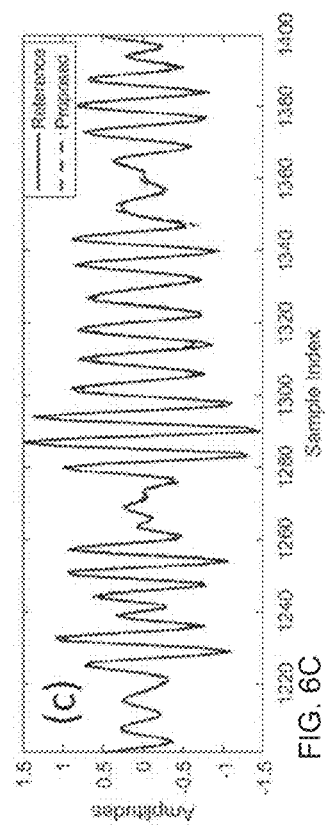
FIGS. 6A and 6C show the amplitudes as extracted along a line of the reconstructed images of FIG. 5C for a method according to embodiments of the present invention for two separate ranges of sample index.
Figure 6C:
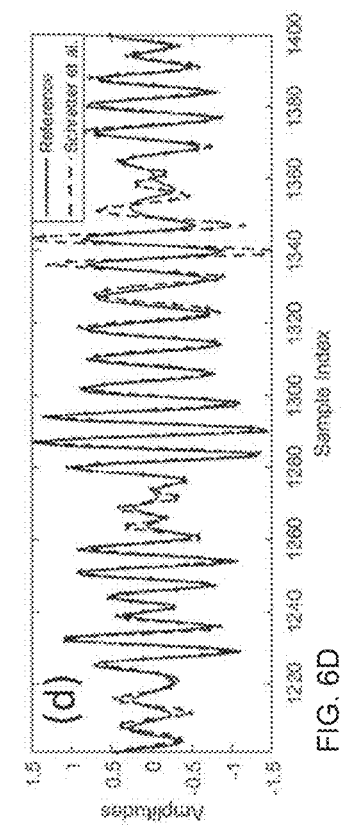
Figure 6B:
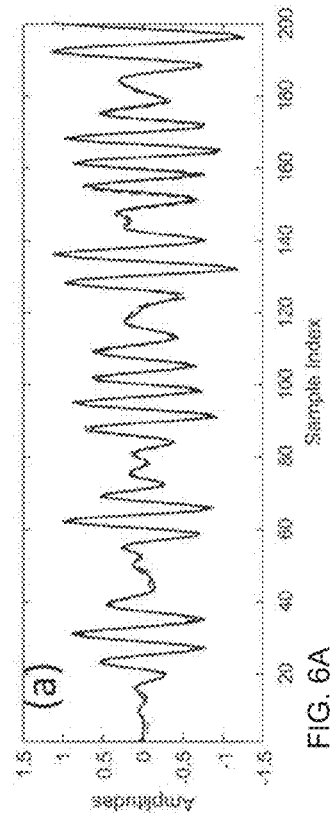
FIGS. 6B and 6D show the amplitudes as extracted along a line of the reconstructed images of FIG. 5C for the method of Schretter et al. for the same ranges of sample index as in FIGS. 6A and 6C respectively.
Figure 6D:
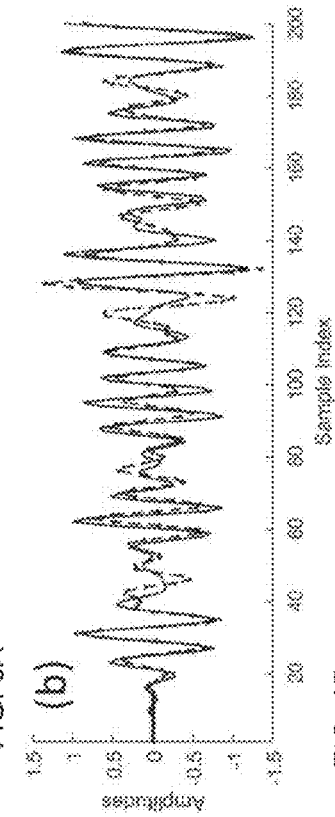

Additionally, the NRMSE decreases as the sampling rate increases for the method according to embodiments of the present invention, whereas for the method of Schretter et al. the NRMSE is sampling rate invariant. It is thought that the method of Schretter et al. cannot exactly reconstruct the full signal because it only searches for the minimum of a regularized energy objective function, as in a least squares approach. Thus the reconstruction problems for different sampling rates are overdetermined and increasing the number of samples does not improve the NRMSE Referring to FIGS. 5A-5E, the reference image (FIG. 5A) and images reconstructed by the method according to embodiments of the present invention and the method of Schretter et al. are shown for sampling rates of 10% (FIG. 5B), 20% (FIG. 5C), 30% (FIG. 5D), and 40% (FIG. 5E). The differences between the reconstructed images can be clearly seen with reference to FIGS. 6A-6D, which show the amplitudes as extracted along a centre line of the reconstructed images for 20% sampling rate. FIGS. 6A and 6C show the amplitudes for the method according to embodiments of the present invention for two separate ranges of sample index. FIGS. 6B and 6D show the amplitudes for the method of Schretter et al. for the same two ranges of sample index. It can be seen that the method according to embodiments of the present invention recovers the full signal more accurately than the method of Schretter et al, as the results using the method of Schretter et al. have a larger difference with the reference (simulated phantom) data in terms of amplitude and phase, and this is consistent with the higher NRMSE performance of the method of Schretter et al. as shown in FIG. 4.

2. Experimental Results

For the in-vitro experiment, parameters as in Table 2 were used and a CIRS Model 054GS General Purpose Ultrasound Phantom (available from Computerized Imagine Reference Systems, Inc., Virginia, USA) was scanned.

Figures 7A, 7B, 7C:
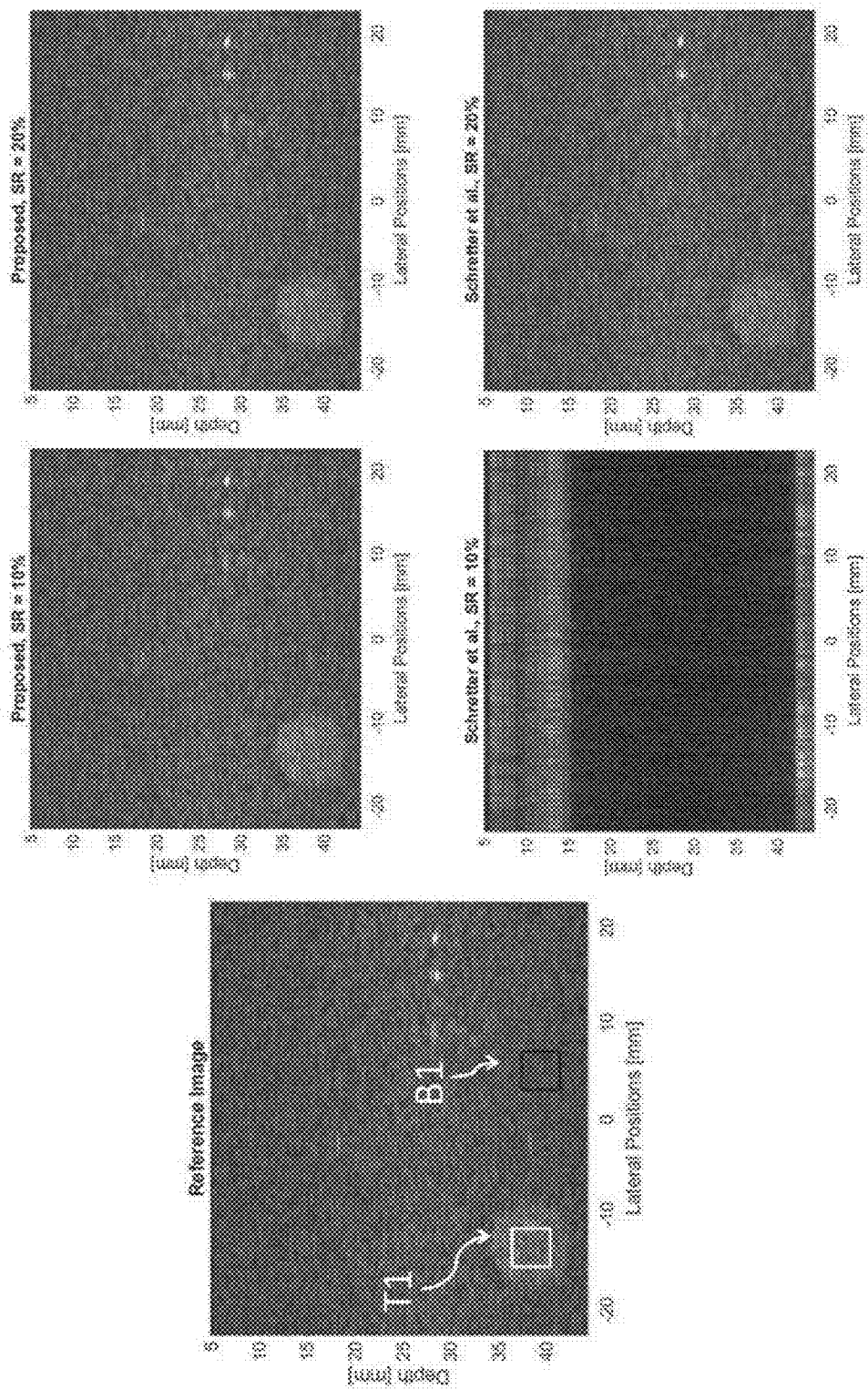
FIG. 7A illustrates a reference image for an in vitro RF dataset.
FIGS. 7B to 7E illustrate images as reconstructed by a method according to embodiments of the present invention and the method of Schretter et al. for various sampling rates, for the in vitro RF dataset.
Figure 7D:
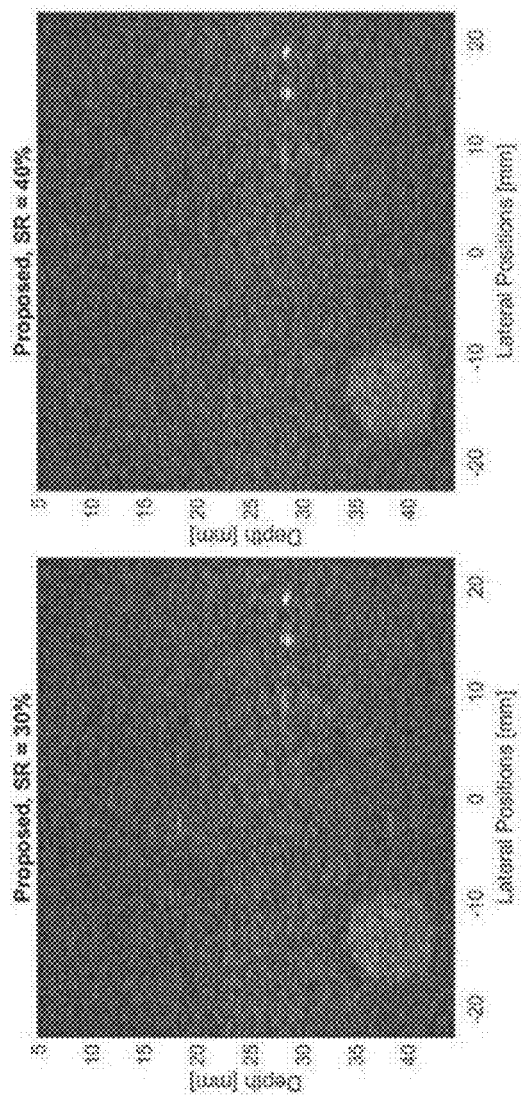
Figure 7E:
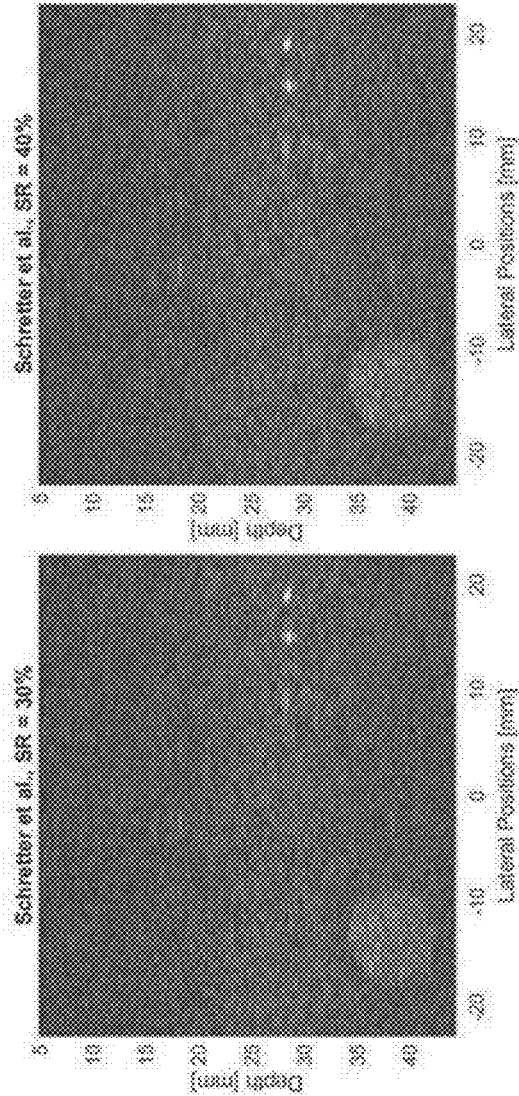

Referring to FIGS. 7A-7E, the reference B-mode image (FIG. 7A) and B-mode images reconstructed by the method according to embodiments of the present invention and the method of Schretter et al. are shown for sampling rates of 10% (FIG. 7B), 20% (FIG. 7C), 30% (FIG. 7D), and 40% (FIG. 7E). A B-mode image is a two-dimensional ultrasound image display composed of bright dots representing the ultrasound echoes. The brightness of each dot is determined by the amplitude of the returned echo signal. It can be seen that the method of Schretter et al. fails at a sampling rate of 10%, whereas the method according to embodiments of the present invention can recover the image accurately. The quality of the reconstructed images can he evaluated using the contrast-to-noise ratio (CNR) according to equation 21:

$$CNR = 20\log_{10} \frac{|\mu_t - \mu_b|}{\sqrt{(\sigma_t^2 + \sigma_b^2)/2}} \quad (21)$$

where $\mu_t$ and $\mu_b$ are the means of gray levels in the target and background region respectively, and $\sigma_t^2$ and $a_b^2$ are the variances of gray levels in the target and background region respectively. A target region is a region of interest in the image, for example a region including a tissue lesion. A background region is a region of normal behavior (for example normal tissue). It will be understood that the background region as shown in FIG. 7A could be located at a different position within the image provided that this region shows normal behavior/properties of the object (for example, tissue) under study. The CNR is calculated on the 8-bit grayscale B-mode image, which was obtained using the following protocol. First, after the beamformed RE image was obtained, the corresponding envelope image was derived through a Hilbert transform. Then the normalized envelope image was gamma-compressed using a gamma value of 0.3. Finally the gamma-compressed image was converted into an 8-bit grayscale B-mode image.

The hyperechoic, or target region and the background region used in CNR calculation are shown in FIG. 7A as T1 and B1 respectively. The CNRs of the two methods for different sampling rates are shown in Table 3, where "Proposed" refers to a method according to embodiments of the present invention.

TABLE 3

CNR assessment for linear scan experimental data

| | | Sampling Rate | | | |
|---|---|---|---|---|---|
| Methods | Reference CNR | 10% | 20% | 30% | 40% |
| Proposed | 7.11 | 7.02 | 7.03 | 7.08 | 7.09 |
| Schretter et al. | | — | 7.17 | 7.13 | 7.05 |

The two methods yield very similar results with the reference image (i.e. a difference in CNR values of less than 0.1 dB). In particular, the method according to embodiments of the present invention produces a lower CNR than the reference image, while for a sampling rate of 20% or 30% the method of Schretter et al. has a higher CNR than the reference image. This may be due to the fact that that methods according to embodiments of the present invention use the sampled measurements (i.e. B in equation 6) to exploit the whole information of the original signal, and so the best case is to have the same CNR as the reference image. However, Schretter et al. uses a simulated dictionary to model the US experiment signals and so there may be information existing in the simulated dictionary which is not present in the real experimental data.

Sectorial Images

Method according to embodiments of the present invention was evaluated on in vivo experiments. For these experiments a comparison was not done with the method of Schretter et al. as the method of Schretter et al. is not compatible with the SLT sectorial scan settings. This is because the dictionary used in the method of Schretter et al. is not suited for this scan geometry. The in vivo cardiac data was collected from a healthy volunteer and the experiment was performed in a fully programmable ultrasound system (HD-PULSE as described in Ortega et al., "Hd-pulse: High channel density programmable ultrasound system based on consumer electronics," in Ultrasonics Symposium (IUS), 2015 IEEE International. IEEE, 2015, pp. 1-3) using a commercially available Samsung phased array probe P2-5AC (64 elements, center frequency of 3.5 MHz, bandwidth of 60%). All signals were sampled at 25 MHz. The focal depth of the SLT transmissions was set at 50 mm and steering angles from −35° to 35° in 1° steps were made, resulting in 71 transmissions. No apodization was used in transmission or reception. A uniform random sampling mask was used to do sparse sampling.

Figure 8A:
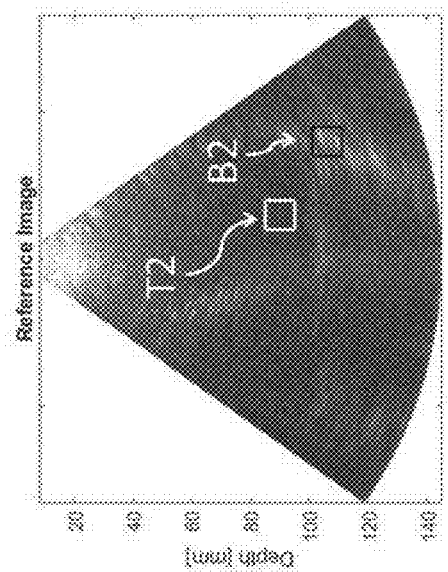
FIG. 8A illustrates a reference image for an in vivo RF dataset.
Figure 8B:
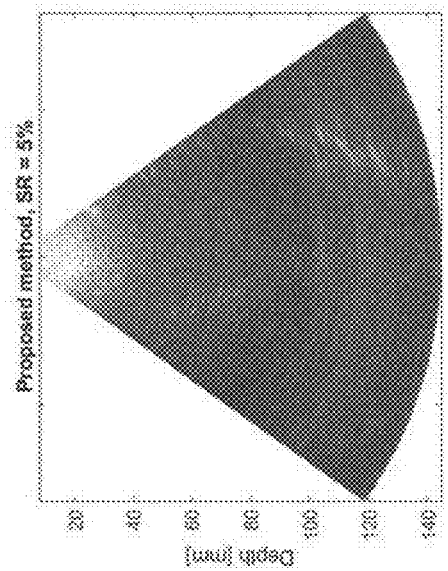
FIGS. 8B to 8F illustrate images as reconstructed by a method according to embodiments of the present invention for various sampling rates, for the in vivo RF dataset.
Figure 8C:
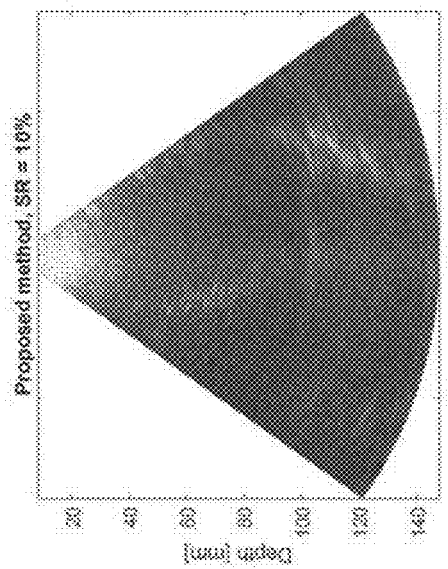
Figure 8D:
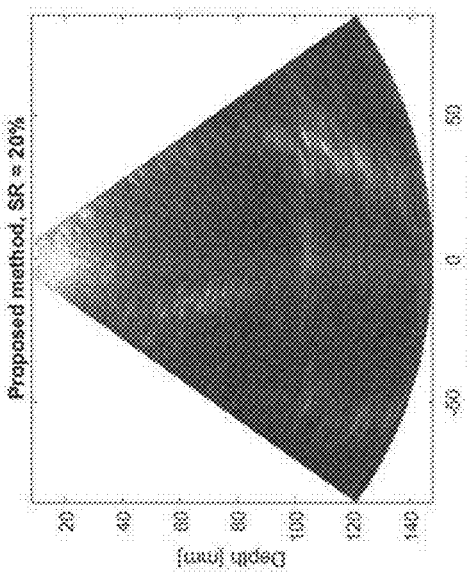
Figure 8E:
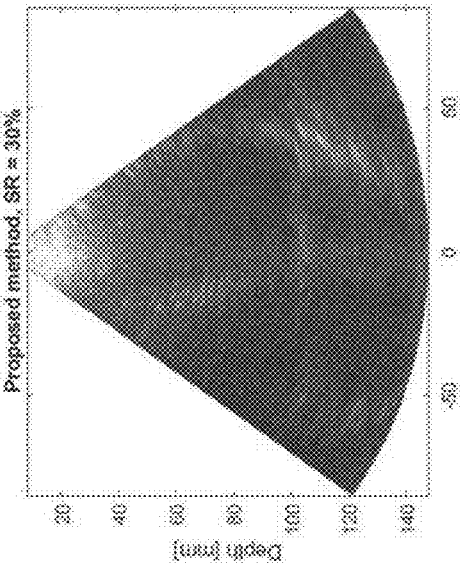
Figure 8F:
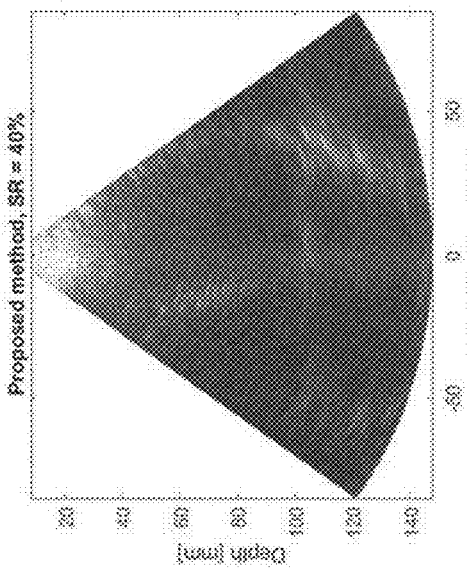

Referring to FIGS. 8A-8F, the reference image (FIG. 8A) and images reconstructed by the method according to embodiments of the present invention are shown for sampling rates of 5% (FIG. 8B), 10% (FIG. 8C), 20% (FIG. 8D), 30% (FIG. 8E), and 40% (FIG. 8F). The target and background regions T and B respectively as used for CNR calculation are denoted as T2 and B2 respectively. The CNR values are shown in Table 4.

TABLE 4

CNR assessment for cardiac data

| Methods | Reference CNR | Sampling Rate | | | | |
|---|---|---|---|---|---|---|
| | | 5% | 10% | 20% | 30% | 40% |
| Proposed | 9.83 | 7.13 | 9.10 | 9.80 | 9.82 | 9.83 |

It is clear that strong artifacts appear for the reconstructed image at the sampling rate of 5%, corresponding to a reduction in the CNR of 2.7 dB. As the sampling rate increases, the artifacts disappear and the CNR improves, resulting in images visually very similar to the reference image. Unlike results obtained in the linear scan, there is a degradation of CNR (by 0.73 dB) for the cardiac image reconstructed from 10% of samples. This may be attributed to correlations (or overlap) between different transmissions of the sectorial scan being poorer than those of the linear scan, which can lead to a poorer low-rank property of the original data matrix X. However, both a visual comparison and the CNR metrics show that the method according to embodiments of the present invention can recover the full signal from 20% of the full signal data while maintaining almost the same image quality as the reference image.

Unlike CS-based strategies, methods according to embodiments of the present invention allow correlations between different channels and transmissions to be explored. Furthermore, the performance of the algorithm is less dependent on the sparse basis. In addition, the proposed approach simultaneously reconstructs the whole data matrix instead of reconstructing the data channel by channel.

Figure 9A:
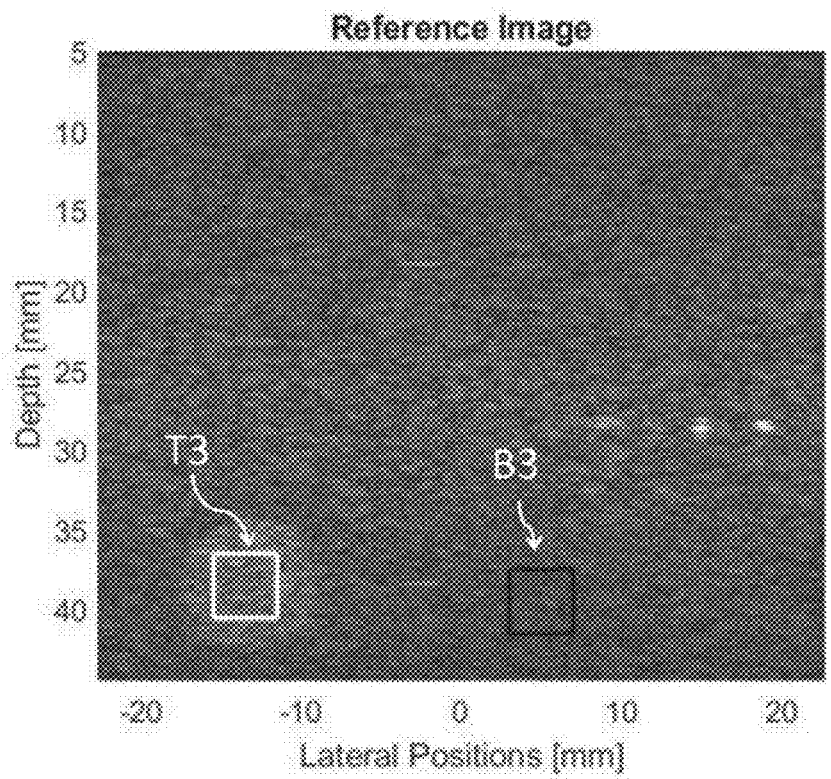
FIG. 9A illustrates a reference image for an in vitro RF dataset.
Figure 9B:
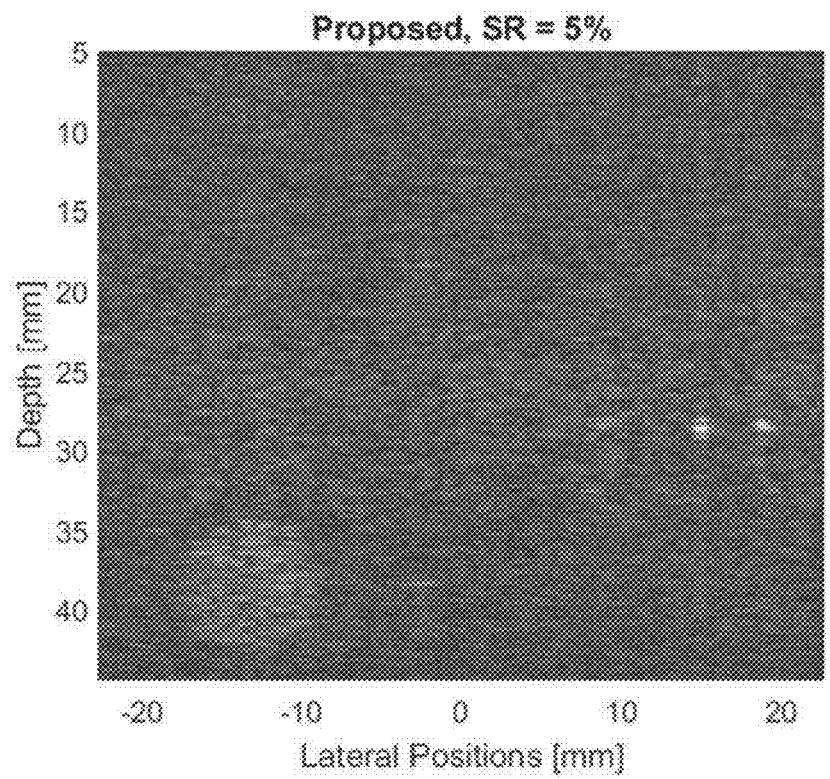
FIG. 9B illustrates an image reconstructed from an undersampled dataset derived from that of FIG. 9A, using a method according to embodiments of the present invention with a sampling rate of 5%.
Figure 9C:
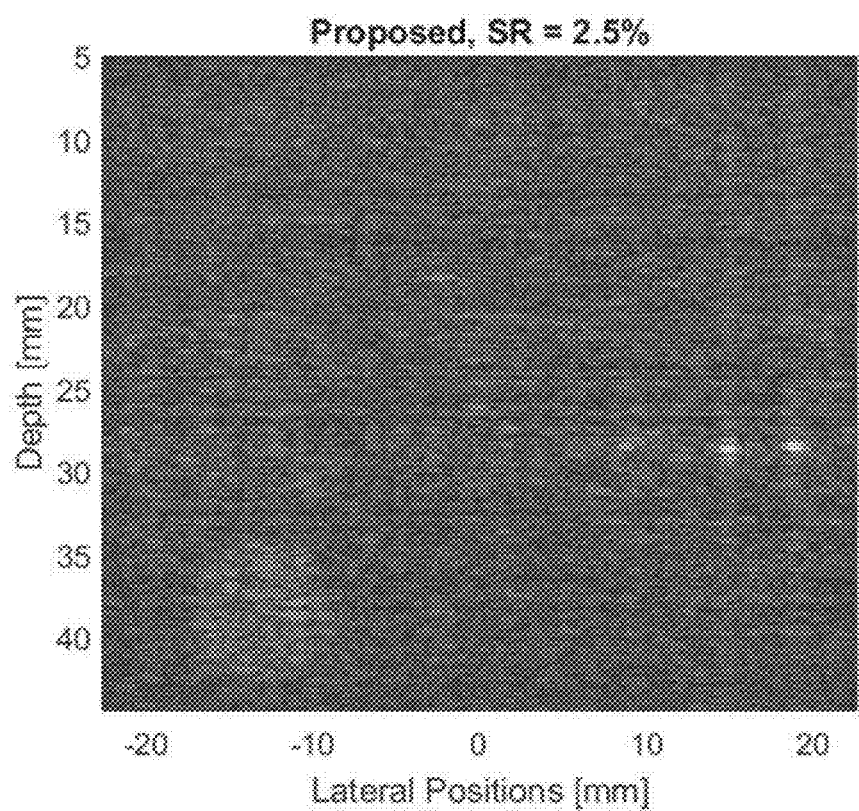
FIG. 9C illustrates an image reconstructed from an undersampled dataset derived front that of FIG. 9A, using a method according to embodiments of the present invention with a sampling rate of 2.5%.

The results obtained from different datasets reveal that methods according to embodiments of the present invention can reduce the sampling rate by 80-90% while keeping adequate image quality. Compared to the existing approach Schretter et al. that fails at 10% of samples in FIG. 7B, the method according to embodiments of the present invention achieves almost the same image quality as reference image with a reduction of CNR less than 0.1 dB. Therefore, it is interesting to investigate how the method according to embodiments of the present invention performs in extreme cases. FIGS. 9A-9C, show the reference Bmode image (FIG. 9A) and the images reconstructed from the method according to embodiments of the present invention using 5% (FIG. 9B) and 2.5% (FIG. 9C) of data samples. The target and background regions are indicated as T3 and B3 respectively. As can be seen, the proposed approach can preserve the main structure of the image even with 2.5% of samples, such as the hyperechoic cyst. However, strong artifacts appear and the image quality is deteriorated. The CNR of the corresponding images of FIG. 9 are 7.11 dB, 6.67 dB and 3.15 dB, respectively.

Figure 10A:
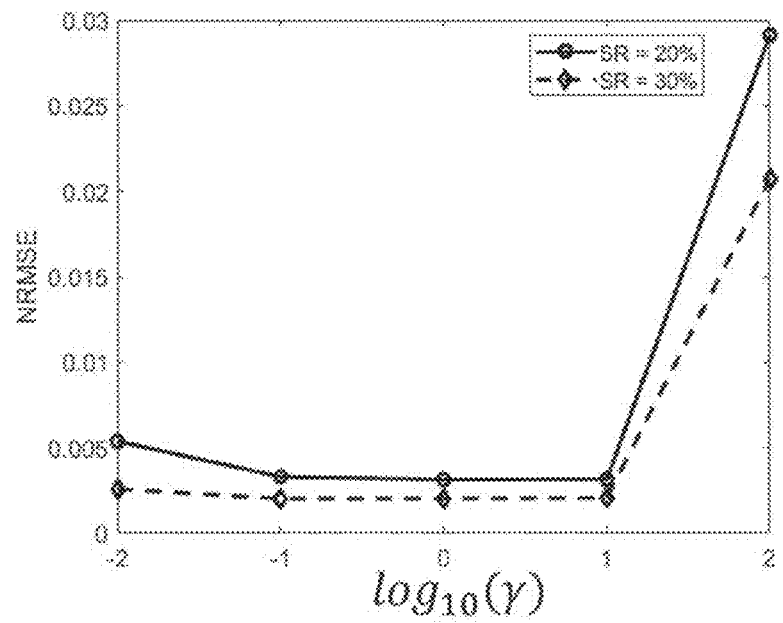
FIG. 10A is a plot of the NRMSE as a function of different values of g for sampling rates of 20% and 30% for a method according to embodiments of the present invention applied to the simulated dataset.
Figure 10B:
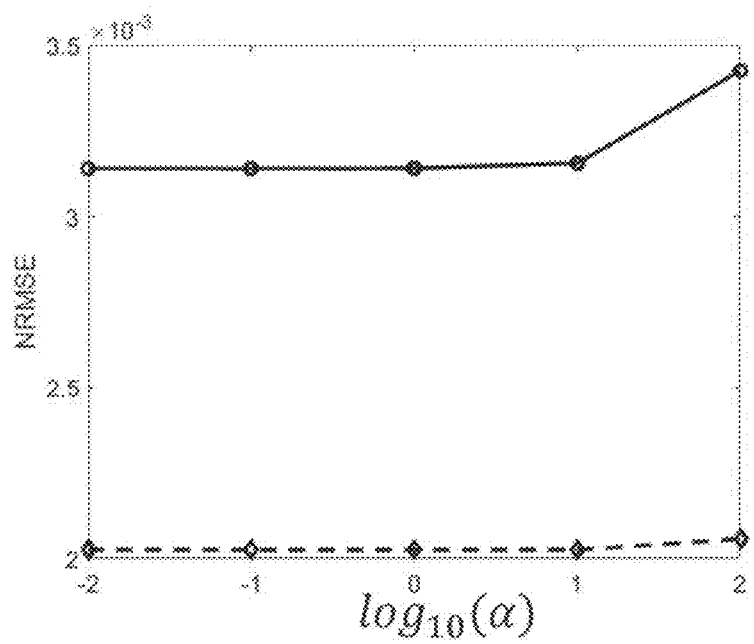
FIG. 10B is a plot of the NRMSE as a function of different values of a for sampling rates of 20% and 30% for a method according to embodiments of the present invention applied to the simulated dataset.
Figure 10C:
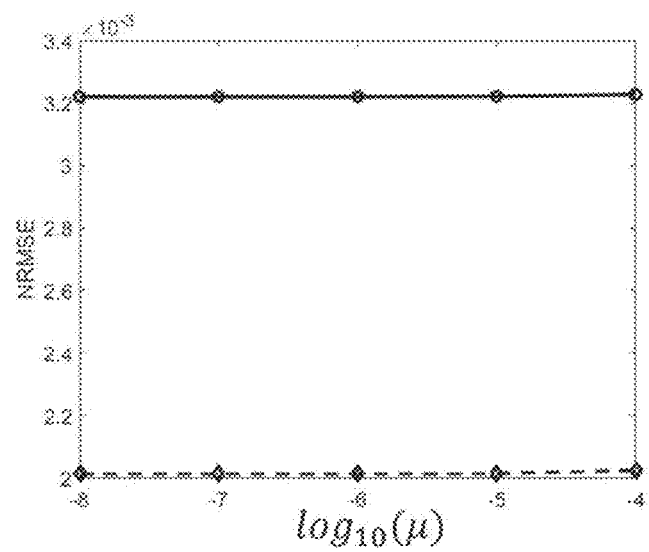
FIG. 10C, is a plot of the NRMSE as a function of different values of m for sampling rates of 20% and 30% for a method according to embodiments of the present invention applied to the simulated dataset.

The input parameters $\gamma$, $\alpha$, $\mu$ of Algorithm 1 and the tolerance of convergence criterion $\eta$ can impact the reconstruction quality of the proposed approach. For a convergence tolerance $\eta$ of $5\times10^{-5}$, the influence of these parameters on the reconstruction of the full signal was investigated. Referring to FIGS. 10A-C, the NRMSE is shown for varying values of each parameter, for the reconstruction of the simulated phantom from the SLT-linear dataset. It can be seen that the three parameters show the same trend in performance for different sampling rate, which means these parameters are fixed with varying sampling rates. In particular, it can be seen that the best results are obtained for $\gamma\Sigma[0.1,10]$ and within this range, the choice of $\gamma$ has little impact on the reconstruction quality. This could be explained by the fact that $\gamma$ is an auxiliary parameter used in SDMM framework, it mainly affects the convergence speed of methods according to embodiments of the present invention. The bigger the value of $\gamma$, the faster the convergence (fewer iterations required). However, since $\gamma$ is also used in the three sub-optimization problems of Step S2, it can influence the reconstruction results. The parameters $\alpha$ and $\mu$ provide the compromise among the three terms of equation 8. From FIGS. 10b and 10c, it can be seen that the best reconstruction results (i.e. lowest NRMSE) are obtained for $\alpha<10$ and $\mu<1e^{-5}$, corresponding to a relatively small weight for the $l_{21}$ norm term compared to the weight of the data consistency term in equation 8, Since the joint-sparsity property of D is used in equation 1 to select the effective frequencies of each $d_n$, the weight of the $l_{21}$ norm term is proportional to the difference between the real bandwidth of the signal and the bandwidth of 1 that is used for the purpose of determining the first dimension of D as described hereinbefore. if the real bandwidth of the signal is 1, minimizing the low—rank property of the data is sufficient and $\alpha=0$. Otherwise, the $l_{21}$ norm term has a weight, i.e. $\alpha>0$. In the results and simulations as described herein, the real bandwidth is close to 1 and $\alpha$ is preferably small, for example is less than 10 in this experiment. However, embodiments of the present invention are not limited to a value of a which is less than 10. For example, a may be less than 100. The data consistency term influences the sampled positions of the reconstructed signal and the best case is the reconstructed signal is the same as the sampled signal in those positions. Thus beyond a certain value of m ($1 \times 10^{-5}$ in these experiments), the choice of in has almost no impact on the results. Therefore, these parameters were set to $\{\gamma, \alpha, \mu,\} = \{1, 0.1, 1e^{-6}\}$ for this dataset.

Figure 11:
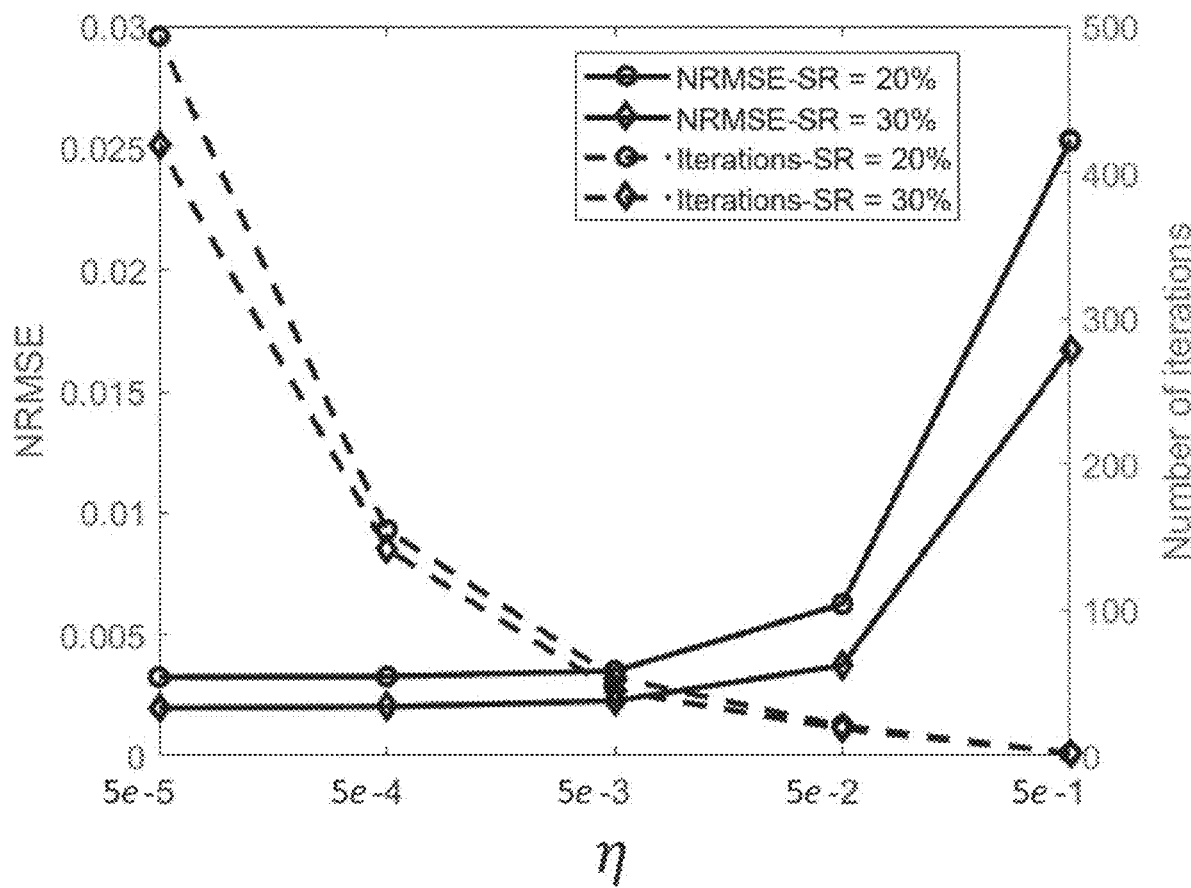
FIG. 11 is a plot of the NRMSE and number of iterations as a function of termination criterion h for sampling rates of 20% and 30%, for a method according to embodiments of the present invention applied to the simulated phantom dataset.

After the input parameters $\{\gamma, \alpha, \mu\}$ are fixed, the result of the optimization method is only influenced by the stop, or termination, criterion $\eta$ (also referred to as convergence parameter). One possible form of the termination criterion $$\eta = \frac{\|D^s - D^{s-1}\|}{\|D^{s-1}\|};$$

is however, the present invention is not limited to this particular formulation and any suitable metric may be used. Referring to FIG. 11, the impact of the termination criterion on the performance of the method is shown. It is clear that a more strict (i.e. smaller) termination criterion leads to a greater number of iterations of the algorithm and a better result (i.e. smaller NRMSE). It can also be seen that when the termination criterion $\eta$ is smaller than $5 \times 10^{-3}$, there is a relatively little improvement in reconstruction quality while the number of iterations is greatly increased. For the results shown herein, a strict stopping criterion of 5×10 was used to provide an optimized result for all of the experiments. However, if both the reconstruction error NRMSE and the reconstruction. time (i.e, number of iterations) are considered, a tolerance of $5 \times 10^{-3}$ may provide an acceptable tradeoff.

IQ Data

Although the results presented hereinbefore show the validation of methods according to embodiments of the present invention applied to RF datasets, the methods can also be used for in-phase and quadrature (IQ) datasets.

The methods were tested as follows. The in vivo cardiac dataset was demodulated with a sampling frequency of 3.57 MHz, i.e. a down sample factor of 7. The method as described hereinbefore was used to reconstruct the entire IQ dataset with different sampling rates of the demodulated IQ signal, that is, the full demodulated IQ signal is sampled at different rates. The parameters in the optimization algorithm were chosen as $\{\mu, \alpha, \gamma\} = \{1e^{-6}, 1, 1\}$ by a cross validation process as described hereinbefore. It is noted that the sampling frequency of IQ data is almost the same as the centre frequency (3.5 MHz). Estimation of D in equation 8 does not simplify the problem, because D is the same size as X in equation 8 for IQ data.

Figure 12A:
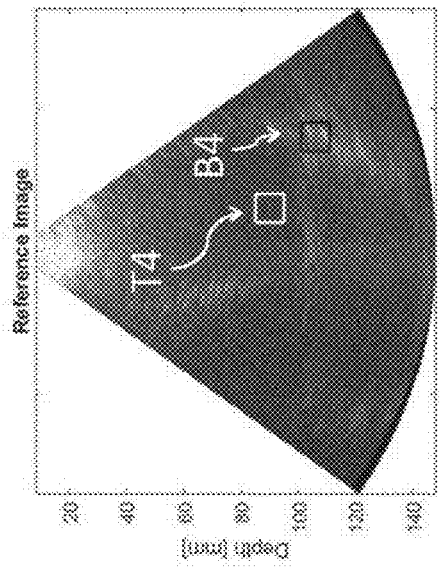
FIG. 12A illustrates an in vivo in phase and quadrature reference image.
Figure 12B:
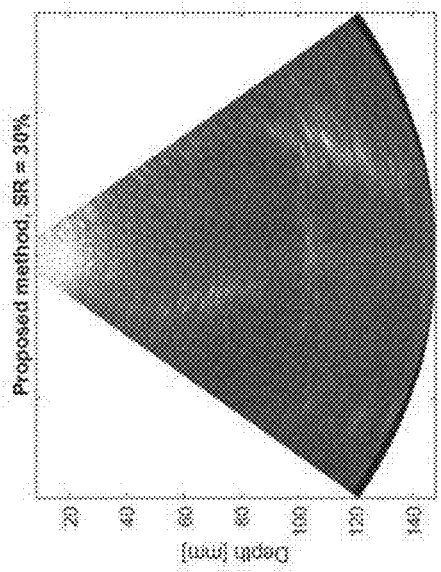
FIGS. 12B to 12F illustrate images as reconstructed by a method according to embodiments of the present invention for various sampling rates, for the in vivo in phase and quadrature dataset.
Figure 12C:
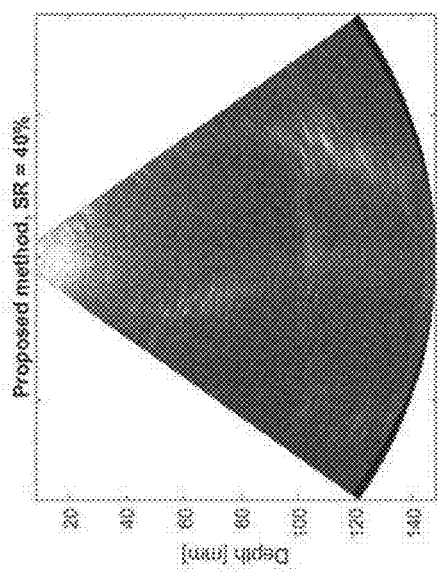
Figure 12D:
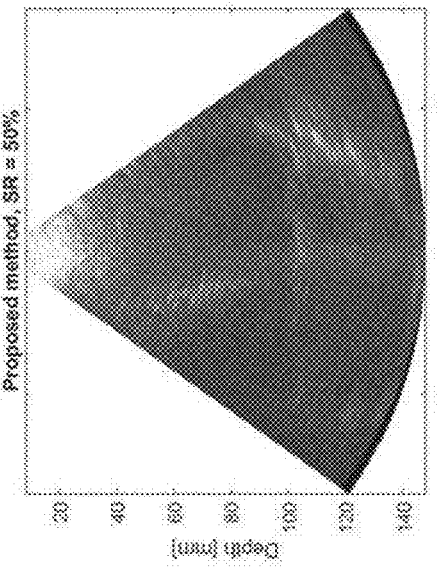
Figure 12E:
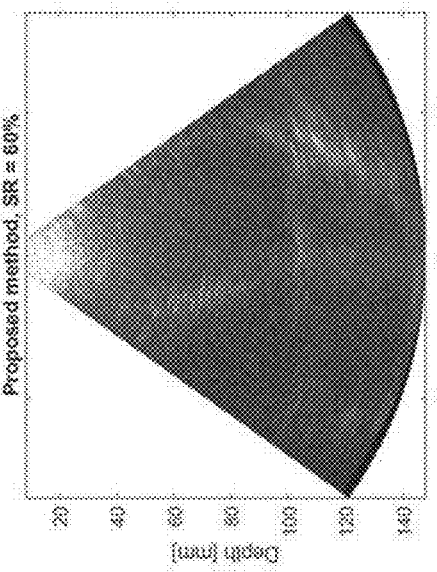
Figure 12F:
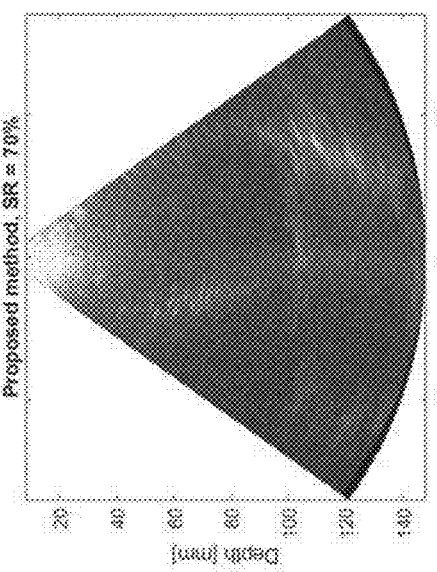

Referring to FIGS. 12A to 12F, the reference image (FIG. 12A) and reconstructed images are shown for sampling rates of the demodulated IQ data of 30% (FIG. 12B), 40% (FIG. 12C), 50% (FIG. 12D), 60% (FIG. 12E), and 70% (FIG. 12F). The target and background images are indicated as T4 and B4, respectively. The corresponding CNRs were calculated and are shown in Table 5. As compared with the results based upon the RF datasets, the reference CNR shows a small decrease (of approximately 0.3 dB), which may be due to the low-pass filter used during the IQ demodulation process.

TABLE 5

CNR assessment for cardiac IQ data

| Methods | Reference CNR | Sampling Rate | | | | |
|---|---|---|---|---|---|---|
| | | 30% | 40% | 50% | 60% | 70% |
| Proposed | 9.52 | 8.88 | 9.30 | 9.43 | 9.52 | 9.52 |

As observed from the results described hereinbefore relating to the RF data, the CNR increases with the sampling rate. If we assume that a difference in CNR between the reconstructed image and the reference image of less than 0.1 dB means no degradation in image quality, then the proposed method can reconstruct the reference image with 50% samples of the IQ data. Taking into account the down sample factor of IQ demodulation (equal to 7 in this case) and a sampling rate of 50% on IQ data, the data used for the reconstruction is approximately 7% of the originally acquired signal data (i.e. before demodulation and downsampling).

Reconstruction Time

As can be seen from FIG. 11, for a given dataset, the number of iterations performed is related to the stopping or termination criterion, that is, a smaller termination criterion requires a greater number of iterations in order to converge. For a given stopping criterion ($5 \times 10^5$ in the results reported herein, although the present invention is not limited to this value and any appropriate value may be chosen), the computation time for the SDMM-based algorithm is proportional to the total data size of the original, or full signals and inversely proportional to the sampling rate. For a constant sampling rate, the larger the original data size, the more variables are required to be recovered and the SVD decomposition (step S3) takes more time in each iteration step.

For example, with the in vivo RF dataset of FIG. 8 (matrix size 4838×4544) and a sampling rate of 40%, it takes about 5 hours to recover the full dataset in Matlab 2017a (The Mathworks, Inc. Natick, MA, USA) on a LENOVO Ideapad 700 (Intel CORE i7-6700 HQ CPU @ 2.60 GHz, 16 GB RAM). The duration for the IQ dataset, matrix size 692× 4544, is approximately 45 minutes. Thus, the computation time could be reduced by reducing the matrix size of X. The computation time could be further reduced by avoiding SVD decompositions. SVD decompositions can be avoided for example as set out in Lu et al., "Low rank enhanced matrix recovery of hybrid dine and frequency data in fast magnetic resonance spectroscopy", IEEE Transactions on Biomedical Engineering, 2017.

Similarly, with the same data size, it can also be seen from FIG. 11 that the number of iterations is inversely proportional to the sampling rate, i.e. the smaller the sampling rate, the more variables need to be recovered and the algorithm requires more iterations in order to converge. The proposed method solves exactly the intermediate optimization problems at each iteration. This could be sped up by using partial updates wherein the cost function (the objective function of equation 7 and/or 8) is reduced at each iteration, but not minimized. The computation time could be further reduced by using a graphics processing unit (GPU).

Alternative Algorithm

It will be appreciated that many modifications may be made to the embodiments hereinbefore described. For example, although the hereinbefore described method is based on a SDMM algorithm, the present invention is not limited to methods using the SDMM algorithm. For example, equation 8 can be solved using an alternative direction method of multiplier (ADMM) algorithm.

Auxiliary variables are introduced according to equation 22:

$$\arg \min_{X,D,R} \|R\|_* + \alpha\|D\|_{2,1} + \frac{1}{2\mu}\|B - P_\Omega(X)\|_F^2 \quad (22)$$

$$\text{subject to } X = YD, X = R$$

Then the augmented Lagrange function of equation 22 is according to equation 23:

$$\arg \min_{G,Q,X,D,R} \|R\|_* + \alpha\|D\|_{2,1} + \frac{1}{2\mu}\|B - P_\Omega(X)\|_F^2 + \quad (23)$$

$$(G, X - YD) + \frac{\beta_1}{2}\|X - YD\|_F^2 + \langle Q, X - R\rangle + \frac{\beta_2}{2}\|X - R\|_F^2$$

where G and Q are the Lagrange multipliers, $\beta_1$ and $\beta_2$ are positive parameters and (A,B) represents $tr(A^T B)$ To solve equation 23, the following steps can be followed.

Step 1

X is updated according to equation 24:

$$X^{s+1} = \arg \min_X \frac{1}{2\mu}\|B - P_\Omega(X)\|_F^2 + \quad (24)$$

$$\frac{\beta_1}{2}\left\|X - YD^s + \frac{G^s}{\beta_1}\right\|_F^2 + \frac{\beta_2}{2}\left\|X - R^s + \frac{Q^s}{\beta_2}\right\|_F^2$$

Equation 24 is an $l_2$ minimisation problem and can be easily solved by setting the first-order derivative equal to zero. $X^{k+1}$ could also be expressed as a summation of two sub-matrices $P_\Omega(X^{k+1})$ and $P_{\bar\Omega}(X^{k+1})$, where $P_{\bar\Omega}(X^{k+1})$, represents the values of $X^{k+1}$ at locations not in the set of locations defined by $\Omega$. The final solution of $X^{k+1}$ is according to equation 25:

$$X^{s+1} = P_\Omega(X^{s+1}) + P_{\bar\Omega}(X^{s+1}) \quad (25)$$

with $P_\Omega(X^{k+1})$ and $P_{\bar\Omega}(X^{k+1})$ according to equation 26:

$$\begin{cases} P_\Omega(X^{s+1}) = \dfrac{P_\Omega(B + \mu\beta_1(YD^s - G^s/\beta_1) + \mu\beta_2(R^s - Q^s/\beta_2))}{1 + \mu(\beta_1 + \beta_2)} \\ P_{\bar\Omega}(X^{s+1}) = \dfrac{P_\Omega(\mu\beta_1(YD^s - G^s/\beta_1) + \mu\beta_2(R^s - Q^s/\beta_2))}{\mu(\beta_1 + \beta_2)} \end{cases} \quad (26)$$

Step 2

R is updated according to equation 27:

$$R^{s+1} = \arg \min_R \|R\|_* + \frac{\beta_2}{2}\left\|X^{s+1} - R + \frac{Q^s}{\beta_2}\right\|_F^2 \quad (27)$$

This is also the matrix completion problem and one method for its solution is shrinking singular values of $X^{k+1}+Q^k/\beta_2$ according to equation 28:

$$R^{s+1} = US(\Sigma, 1/\beta_2)V^T \quad (28)$$

where $U\Sigma V^T$ is the Singular Value Decomposition (SVD) of $X^{k+1}+Q^k/\beta_2$, S(a, b)=sgn (a)(|a|−b) for |a|≥b and zero otherwise.

Step 3

D is updated according to equation 29:

$$D^{s+1} = \arg \min_D \alpha\|D\|_{2,1} + \frac{\beta_1}{2}\left\|X^{s+1} - YD + \frac{G^s}{\beta_1}\right\|_F^2 \quad (29)$$

Due to the separate structure of the l2,1 norm, this problem can be solved by minimizing each row of D separately. Let $P=Y_r(X^{k+1}+G^k/\beta_1)$ and represent the i-th row of matrix P as $p^i$, and the i-th row of matrix $D^{k+1}$ as $D^{i,k+1}$. The closed form solution for each row of $D^{k+1}$ is given according to equation 30:

$$D^{i,s+1} = \left(1 - \left(\frac{\alpha/\beta_1}{\|p^i\|_2}\right)\right)_+ p^i \quad (30)$$

where the symbol (v)+ denotes a vector with entries receiving values of max($v_i$, 0).

Step 4

G is updated according to equation 31:

$$G^{s+1} = \beta_1(X^{s+1} - YD^{s+1}) \quad (31)$$

and Q is updated according to equation 32:

$$Q^{s+1} = \beta_2(X^{s+1} - R^{s+1}) \quad (32)$$

A convergence parameter q is evaluated according to $$\eta = \frac{\|D^s - D^{s-1}\|}{\|D^{s-1}\|}.$$

If the convergence parameter ti is greater than a predetermined value, the algorithm returns to step 1 and repeats. If the convergence parameter η is less than the predetermined value, the algorithm terminates and D is provided as output.

The ADMM-based numerical scheme for solving equation 8 can thus be summarized as in Table 6:

TABLE 6

ADMM-based numerical scheme

Input: B, Y, $P_\Omega$, α, μ, β1, β2
Initialization: $G^s$, $Q^s$, $D^s$, $R^s$
while not converged do
| | |
|---|---|
| $X^{s+1} \Leftarrow D^s, G^s, R^s, Q^s$ | ∇ update $X^{s+1}$ using (23) |
| $R^{s+1} \Leftarrow Q^s, X^{s+1}$ | ∇ update $R^{s+1}$ using (26) |
| $D^{s+1} \Leftarrow G^s, X^{s+1}$ | ∇ update $D^{s+1}$ using (28) |
| $G^{s+1} \Leftarrow X^{s+1}, D^{s+1}$ | ∇ update $G^{s+1}$ using (29) |
| $Q^{s+1} \Leftarrow X^{s+1}, R^{s+1}$ | ∇ update $Q^{s+1}$ using (30) |

TABLE 6-continued

ADMM-based numerical scheme end while
Output: X, D

As indicated above, an apparatus according to embodiments of the present invention comprises a processing element and/or processing module wherein a method according to an embodiment of the present invention is implemented. Such a processing element and/or module typically may include at least one programmable processor coupled to a memory subsystem that includes at least one form of memory, e.g., RAM, ROM, and so forth. It is to be noted that the processor or processors may be a general purpose, or a special purpose processor, and may be for inclusion in an apparatus or part thereof, e.g., a chip that has other components that perform other functions. Thus, one or more aspects of the present invention can be implemented in digital electronic circuitry, or in computer hardware, firmware, software, or in combinations of them. The processing system may include a storage subsystem. In some implementations, a display system, a keyboard, and a pointing device may be included as part of a user interface subsystem to provide for a user to manually input information. Ports for inputting and outputting data also may be included. More elements such as network connections, interfaces to various devices, and so forth, may be included. The various elements of the processing system may be coupled in various ways, including via a bus subsystem for simplicity as a single bus, but will be understood to those in the art to include a system of at least one bus. The memory of the memory subsystem may at some time hold part or all of a set of instructions that when executed on the processing system implement the steps of the method embodiments described herein.

In one aspect, the present invention also relates to a carrier medium or a computer readable medium comprising instructions which, when executed by a computer, cause the computer to carry out a method as described above. The terms "carrier medium" and "computer readable medium" as used herein refer to any medium that participates in providing instructions to a processor for execution. Such a medium may take many forms, including but not limited to, non-volatile media, volatile media, and transmission media. Non-volatile media includes, for example, optical or magnetic disks, such as a storage device which is part of mass storage. Volatile media includes dynamic memory such as RAM. Transmission media include coaxial cables, copper wire and fiber optics, including the wires that comprise a bus within a computer. Transmission media can also take the form of acoustic or light waves, such as those generated during radio wave and infra-red data communications.

Common forms of computer readable media include, for example a floppy disk, a flexible disk, a hard disk, magnetic tape, or any other magnetic medium, a CD-ROM, any other optical medium, punch cards, paper tapes, any other physical medium with patterns of holes, a RAM, a PROM, an EPROM, a FLASH-EPROM, any other memory chip or cartridge, a carrier wave as described hereafter, or any other medium from which a computer can read.

Various forms of computer readable media may be involved in carrying one or more sequences of one or more instructions to a processor for execution. For example, the instructions may initially be carried on a magnetic disk of a remote computer. The remote computer can load the instructions into its dynamic memory and send the instructions over a telephone line using a modem. A modem local to the computer system can receive the data on the telephone line and use an infrared transmitter to convert the data to an infrared signal. An infrared detector coupled to a bus can receive the data carried in the infra-red signal and place the data on the bus. The bus carries data to main memory, from which a processor retrieves and executes the instructions. The instructions received by main memory may optionally be stored on a storage device either before or after execution by a processor. The instructions can also be transmitted via a carrier wave in a network, such as a LAN, a WAN or the internet. Transmission media can take the form of acoustic or light waves, such as those generated during radio wave and infrared data communications. Transmission media include coaxial cables, copper wire and fibre optics, including the wires that form a bus within a computer.

The invention claimed is:

1. A method for estimating a full signal X from a subset B of the full signal X, the method comprising:
   a transmitter comprising one or more transmitting elements for emitting ultrasound excitation pressure waves into a propagation medium containing non-uniformities capable of reflecting said excitation pressure waves,
   and a receiver for receiving the full signal X, wherein the receiver comprises one or more receiver elements, receiving a plurality of randomly sampled multichannel radio-frequency or in-phase and quadrature signals acquired from the propagation medium
   modelling the full signal X as a matrix comprising a plurality of vector signals, each vector signal corresponding to the full signal X incident on a corresponding receiver element, wherein each vector signal comprises a plurality of samples representing the full signal X sampled from a corresponding receiver element, wherein each sample comprises a weighted sum of complex sinusoids, wherein the full signal X is expressed as a matrix product of a first matrix Y and a second matrix D;
   updating the second matrix D based on an objective function, wherein the objective function is configured to estimate the second matrix D based on the plurality of randomly sampled signals, to produce an updated second matrix D1;
   determining a convergence parameter in dependence upon the evaluated objective function; and
   modifying the updated second matrix D1 in dependence upon the convergence parameter, and outputting the estimated full signal X.

2. The method according to claim 1, wherein modifying the updated second matrix D1 in dependence upon the convergence parameter comprises comparing the convergence parameter with a predetermined threshold value.

3. The method according to claim 2, further comprising, if the convergence parameter is greater than the predetermined threshold value, repeating the step of evaluating the objective function for a modified first trial matrix.

4. The method according to claim 2, further comprising, if the convergence parameter is less than the predetermined threshold value, determining an estimated full signal X in dependence upon the updated second matrix D1 and the first matrix Y.

5. The method according to claim 4, wherein estimating the full signal X comprises a minimizing process of a nuclear norm of the full signal X.

6. The method according to claim 4, further comprising generating an image in dependence upon the estimated full signal X.

7. The method according to claim 1, wherein the complex sinusoids have a finite number k of distinct frequencies.

8. The method according to claim 7, wherein each weighted sum comprises sinusoids at the same k distinct frequencies.

9. The method according to claim 8, wherein the second matrix Y comprises the set of k complex sinusoids.

10. The method according to claim 9, wherein the second matrix D comprises, for each vector signal, a set of k coefficients corresponding to the complex sinusoids.

11. The method according to claim 10, wherein a rank of the first matrix X is less than k.

12. The method according to claim 1, wherein the transmitter is configured to emit ultrasound excitation pressure waves having frequencies within a frequency band.

13. The method according to claim 12, wherein the complex sinusoids have frequencies within the frequency band.

14. The method according to claim 1, wherein estimating the full signal X comprises a simultaneous direction method of multipliers method.

15. The method according to claim 1, wherein estimating the full signal X comprises a minimizing process of an l norm of the second matrix D.

16. An apparatus for performing ultrasound measurements of a propagation medium containing non-uniformities, the apparatus comprising:
   an ultrasound transducer configured to emit ultrasound excitation pressure waves;
   a receiver comprising one or more elements for receiving a full signal X resulting from reflection of said excitation pressure waves by the non-uniformities; and
   a processor configured to receive a set of random samples B of the full signal X or of a demodulated full signal X and to estimate the full signal X from the set of random samples, wherein the processor is configured to perform the steps of:
   modelling the full signal X as a matrix comprising a plurality of vector signals, each vector signal corresponding to the full signal incident on a corresponding receiver element, wherein each vector signal comprises a plurality of samples representing the full signal sampled from a corresponding receiver element, wherein each sample comprises a weighted sum of complex sinusoids, wherein the full signal X is expressed as a matrix product of a first matrix Y and a second matrix D;
   updating the second matrix D based on an objective function, wherein the objective function is configured to estimate the second matrix D based on the randomly sampled signals, to produce an updated second matrix D1;
   determining a convergence parameter in dependence upon the evaluated objective function;
   modifying the updated second matrix D1 in dependence upon the convergence parameter, and outputting the estimated full signal X.

17. The apparatus according to claim 16, further comprising a sampling element configured to receive the full signal X or a demodulated full signal X and to provide a set of random samples of the full signal B or of a demodulated full signal B to the processor.

18. The apparatus according to claim 16, wherein modifying the updated second matrix D1 in dependence upon the convergence parameter comprises comparing the convergence parameter with a predetermined threshold value.

19. The apparatus according to claim 18, wherein the processor is configured to, if the convergence parameter is greater than the predetermined threshold value, repeat the step of evaluating the objective function for the updated second trial matrix.

20. The apparatus according to claim 18, wherein the processor is configured to, if the convergence parameter is less than the predetermined threshold value, determine an estimated full signal X in dependence upon the updated second matrix DI and the first matrix Y.

21. The apparatus according to claim 20, wherein the processor is configured to output the estimated full signal X.

22. The apparatus according to claim 20, wherein the processor is configured to generate an image in dependence upon the estimated full signal X.

* * * * *